US012699174B1

(12) United States Patent     (10) Patent No.:   US 12,699,174 B1

Al Ahmad           (45) Date of Patent:       Aug. 4, 2026

---

(54) FMCW RADAR SIGNAL PROCESSING FOR DISTANCE ESTIMATION

(71) Applicant: United Arab Emirates University, Al Ain (AE)

(72) Inventor: Mahmoud F. Y. Al Ahmad, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 19/244,839

(22) Filed: Jun. 20, 2025

(51) Int. Cl.
    *G01S 13/36*      (2006.01)
    *G01S 7/35*       (2006.01)
    *G01S 7/40*       (2006.01)

(52) U.S. Cl.
    CPC .............. *G01S 13/36* (2013.01); *G01S 7/358* (2021.05); *G01S 7/40* (2013.01)

(58) Field of Classification Search
    CPC ........ G01S 13/36; G01S 13/34; G01S 13/343; G01S 13/345; G01S 7/354; G01S 7/358; G01S 7/40; G01S 7/4056
    USPC ................................. 342/194, 189, 195, 192
    See application file for complete search history.

(56) References Cited

U.S. PATENT DOCUMENTS 4,028,699 A * 6/1977 Stevens ................... G06F 17/15
                                       342/194
5,381,152 A * 1/1995 Klausing ............. G01S 13/9082
                                       342/25 F 5,581,517 A * 12/1996 Gee ........................ G01S 7/5209
                                       367/138
5,781,144 A * 7/1998 Hwa ........................ G01S 7/021
                                       342/197
5,781,591 A * 7/1998 Wolf ..................... G01S 7/2922
                                       375/353
6,097,669 A * 8/2000 Jordan .................... G01S 7/527
                                       367/901
6,430,216 B1 * 8/2002 Kober ................. H01Q 3/2605
                                       375/150

(Continued)

OTHER PUBLICATIONS

Pan et al. "Low-Complexity Time-Domain Ranging Algorithm with FMCW Sensors", *Sensors 2019*, 19, 3176.

*Primary Examiner* — Michael W Justice
(74) *Attorney, Agent, or Firm* — KNOBBE, MARTENS, OLSON & BEAR, LLP

(57)            ABSTRACT

A method and a Frequency-Modulated Continuous-Wave (FMCW) radar sensor are disclosed for estimating the distance to a target. The sensor comprises a transmitter, a receiver, and a signal processor. The receiver obtains a time-domain in-phase (I) signal and/or a quadrature-phase (Q) signal based on an echo of an emitted frequency-modulated wave. The signal processor is configured to isolate a segment of the time-domain signal, such as a signal peak between two local minima, and extract a waveform metric directly from the isolated segment. A predetermined function, such as a regression model, defines a mapping between a plurality of such waveform metrics and corresponding distance values. The processor inputs the extracted waveform metric into the predetermined function to receive a distance, thereby estimating the target's distance without requiring a frequency-domain transformation of the echo signal. The predetermined function may be generated by correlating waveform metrics acquired at known distances.

20 Claims, 14 Drawing Sheets

(56) References Cited

U.S. PATENT DOCUMENTS

| | | | | |
|---|---|---|---|---|
| 6,448,923 | B1 * | 9/2002 | Zrnic | G01S 13/951 |
| | | | | 342/195 |
| 6,600,729 | B1 * | 7/2003 | Suzuki | H04B 1/71075 |
| | | | | 375/150 |
| 6,753,803 | B2 * | 6/2004 | Szajnowski | G01S 13/52 |
| | | | | 342/21 |
| 6,806,821 | B2 * | 10/2004 | McLemore | G01S 13/888 |
| | | | | 342/195 |
| 6,947,474 | B2 * | 9/2005 | Kober | H04B 7/0891 |
| | | | | 375/150 |
| 7,034,744 | B2 | 4/2006 | Zimmermann et al. | |
| 7,151,477 | B2 * | 12/2006 | Szajnowski | G01S 13/52 |
| | | | | 342/21 |
| 7,236,123 | B2 * | 6/2007 | Siegel | G01S 7/2923 |
| | | | | 342/194 |
| 8,711,038 | B2 * | 4/2014 | Reede | G01S 5/0289 |
| | | | | 342/463 |
| 9,041,597 | B2 * | 5/2015 | Gallone | G01S 7/2923 |
| | | | | 342/159 |
| 9,119,598 | B2 * | 9/2015 | Engelbrecht | A61B 5/7246 |
| 9,671,488 | B2 * | 6/2017 | Larsson | G01F 23/804 |
| 10,594,358 | B2 * | 3/2020 | Cheung | G01S 7/52031 |
| 11,051,702 | B2 * | 7/2021 | Lin | G16H 50/30 |
| 11,181,617 | B2 | 11/2021 | Rittberg et al. | |
| 11,199,619 | B2 * | 12/2021 | Kishigami | G01S 13/42 |
| 11,476,891 | B2 * | 10/2022 | Cheung | G01S 7/4021 |
| 11,500,058 | B2 * | 11/2022 | Hu | G01S 13/003 |
| 11,622,693 | B2 * | 4/2023 | Lin | G01S 13/583 |
| | | | | 600/301 |
| 11,650,302 | B2 * | 5/2023 | Sautermeister | G01F 23/284 |
| | | | | 73/290 R |
| 11,703,593 | B2 * | 7/2023 | Alalusi | G01S 7/292 |
| | | | | 356/5.01 |
| 12,019,141 | B2 * | 6/2024 | Overdevest | G01S 13/584 |
| 12,241,968 | B2 | 3/2025 | Li et al. | |
| 12,256,360 | B2 * | 3/2025 | Hu | G01S 11/06 |
| 12,352,889 | B2 * | 7/2025 | Zhu | H04L 5/0051 |
| 2002/0090025 | A1 * | 7/2002 | Kober | H04B 7/0891 |
| | | | | 375/E1.032 |
| 2002/0176488 | A1 * | 11/2002 | Kober | H04B 7/10 |
| | | | | 375/147 |
| 2002/0186161 | A1 * | 12/2002 | Szajnowski | G01S 13/52 |
| | | | | 342/21 |
| 2004/0178942 | A1 * | 9/2004 | McLemore | G01S 7/285 |
| | | | | 342/28 |
| 2006/0049978 | A1 * | 3/2006 | Siegel | G01S 13/534 |
| | | | | 342/194 |
| 2010/0245154 | A1 * | 9/2010 | Szajnowski | G01S 7/023 |
| | | | | 342/104 |
| 2012/0032855 | A1 * | 2/2012 | Reede | G01S 13/82 |
| | | | | 370/252 |
| 2013/0038485 | A1 * | 2/2013 | Nakamura | G01S 7/4865 |
| | | | | 342/195 |
| 2013/0169473 | A1 * | 7/2013 | Gallone | G01S 7/414 |
| | | | | 342/159 |
| 2014/0073863 | A1 * | 3/2014 | Engelbrecht | A61B 5/7264 |
| | | | | 600/301 |
| 2014/0073866 | A1 * | 3/2014 | Engelbrecht | A61B 5/7246 |
| | | | | 600/301 |
| 2014/0073875 | A1 * | 3/2014 | Engelbrecht | A61B 5/7203 |
| | | | | 600/301 |
| 2014/0073954 | A1 * | 3/2014 | Engelbrecht | A61B 5/02416 |
| | | | | 600/479 |
| 2018/0263502 | A1 * | 9/2018 | Lin | G01S 7/415 |
| 2020/0142047 | A1 * | 5/2020 | Zwirn | G01S 13/003 |
| 2020/0225337 | A1 * | 7/2020 | Kishigami | G01S 7/41 |
| 2020/0363521 | A1 * | 11/2020 | Sautermeister | G01F 23/284 |
| 2021/0033729 | A1 * | 2/2021 | Alalusi | G01S 17/93 |
| 2021/0215789 | A1 * | 7/2021 | Hu | G01S 7/415 |
| 2021/0321879 | A1 * | 10/2021 | Lin | A61B 5/7207 |
| 2022/0187438 | A1 * | 6/2022 | Overdevest | G01S 13/532 |
| 2022/0397653 | A1 * | 12/2022 | Perin | G01S 7/4912 |
| 2022/0397668 | A1 * | 12/2022 | Perin | G01S 7/4912 |
| 2023/0305132 | A1 * | 9/2023 | Subburaj | G01S 13/343 |
| 2024/0064691 | A1 * | 2/2024 | Hu | G01S 11/06 |
| 2024/0125888 | A1 * | 4/2024 | Zhu | G01S 7/415 |
| 2024/0175983 | A1 * | 5/2024 | Zhu | G01S 13/86 |
| 2025/0102620 | A1 * | 3/2025 | Månsson | G01S 13/0209 |
| 2025/0141715 | A1 * | 5/2025 | Wang | H04L 25/0204 |
| 2025/0251492 | A1 * | 8/2025 | Rafique | G01S 13/584 |

* cited by examiner

FMCW Radar Sensor

Printer Bed

FMCW RADAR SIGNAL PROCESSING FOR DISTANCE ESTIMATION

TECHNICAL FIELD

The present disclosure relates to the field of radar signal processing. More specifically, the disclosure pertains method and device for signal processing of FMCW radar sensor data for estimating a distance between the sensor and a target.

BACKGROUND

Frequency-Modulated Continuous-Wave (FMCW) radar systems are widely used for distance measurement in various applications, including automotive driver-assistance systems, industrial automation, and level sensing.

In an FMCW system, a radio wave is transmitted whose frequency is modulated, typically in a linear pattern. The received echo signal, reflected from a target, is mixed with a portion of the transmitted signal to produce a low-frequency beat signal. The characteristics of this beat signal are then analyzed to determine the target's distance.

Past signal processing techniques in the field of FMCW radar systems are typically associated with computational inefficiency, therefore, further improvements in signal processing for FMCW radar systems are desirable.

SUMMARY

A disclosed method introduces a refined methodology for distance estimation using FMCW radar by leveraging specific waveform metrics, e.g., peak center location, from a time-domain signal, e.g., the in-phase (I) signal. Some FFT- and phase-based approaches, while effective in coarse distance estimation, suffer from resolution limitations and quantization effects, particularly when tracking fine-scale changes in target position. To overcome these drawbacks, the present disclosure includes, among other things, analysis of waveform metrics in the time-domain. By incorporating signal-segmentation and feature-mapping the disclosure surpasses other methods in precision and resolution.

In a first aspect there is disclosed a method for estimating a distance between a radar sensor and a target. The radar sensor comprises a transmitter, a receiver and a signal processor. The method comprising the steps of:

emitting, by the transmitter, a radio wave, wherein the radio wave frequency is modulated over time;
    obtaining, by the receiver, a time-domain in-phase signal and/or a time-domain quadrature-phase signal indicative of amplitude and phase information of an echo of the emitted radio wave;
    selecting for processing, by the signal processor, the time-domain in-phase signal and/or the time-domain quadrature-phase signal;
    isolating, by the signal processor, a segment of the selected time-domain in-phase signal and/or the time-domain quadrature-phase signal;
    extracting, by the signal processor, a waveform metric from the isolated segment of the selected time-domain in-phase signal and/or the time-domain quadrature-phase signal;
    obtaining, by the signal processor, a predetermined function defining a mapping between a plurality of waveform metrics and a corresponding plurality of distance values;

inputting, by the signal processer, the extracted waveform metric to the predetermined function;
    receiving, by the signal processor, a distance outputted by the predetermined function.

In a second aspect there is proposed a method for calibrating a Frequency-Modulated Continuous-Wave (FMCW) radar sensor. The FMCW radar sensor comprising a transmitter, a receiver and a signal processor. The method comprises acquiring a plurality of waveform metrics corresponding to a plurality of known distances to a target. The method comprises, for each distance among the plurality of known distances:

emitting, by the transmitter, a radio wave, wherein the radio wave frequency is modulated over time;
    obtaining, by the receiver, a time-domain in-phase signal and/or a time-domain quadrature-phase signal indicative of amplitude and phase information of an echo of the emitted radio wave;
    selecting for processing, by the signal processor, the time-domain in-phase signal and/or the time-domain quadrature-phase signal;
    isolating, by the signal processor, a segment of the selected time-domain in-phase signal and/or the time-domain quadrature-phase signal;
    extracting, by the signal processor, a waveform metric from the isolated segment of the selected time-domain in-phase signal and/or the time-domain quadrature-phase signal;

The method further comprises:

determining, by the signal processer, a predetermined function by correlating the plurality of acquired waveform metrics with the corresponding plurality of known distances.

In a third aspect there is proposed a Frequency-Modulated Continuous-Wave (FMCW) radar sensor. The FMCW radar comprising a transmitter and receiver. The transmitter being configured to continuously emit a radio wave which frequency is modulated over time in a known pattern. The receiver being configured to obtain at least one time-domain signal that represents the amplitude and phase information of an echo of the emitted radio wave relative to a local oscillator signal. The FMCW radar further comprising a signal processor operatively connected to the receiver, and being configured to:

select for processing the time-domain in-phase signal and/or the time-domain quadrature-phase signal;
    isolate a segment within the selected time-domain in-phase signal and/or the time-domain quadrature-phase signal;
    extract a waveform metric from the isolated segment of the selected time-domain in-phase signal and/or the time-domain quadrature-phase signal; and
    obtaining, by the signal processor, a predetermined function defining a mapping between a plurality of waveform metrics and a corresponding plurality of distance values;
    inputting, by the signal processer, the extracted waveform metric to the predetermined function;
    receiving, by the signal processor, a distance outputted by the predetermined function.

The technical effects of the disclosed aspects, as recited in the detailed description, provide for a robust and high-precision distance estimation method. A primary effect is the significant enhancement in accuracy and resolution over conventional Fast Fourier Transform (FFT) and phase-based techniques by obviating the quantization and resolution limitations inherent therein. By operating on a specific, isolated segment of a time-domain signal to extract a morphological waveform metric, the method achieves this enhanced precision while simultaneously reducing computational load and memory requirements, rendering it suitable for real-time embedded systems.

Furthermore, the utilization of a continuous-wave emission, as opposed to a pulsed emission, fundamentally eliminates the "minimum range blindness" problem that affects pulse-based radars, thereby ensuring high reliability for short-range measurements. This continuous nature also allows for the simultaneous determination of both target range and velocity from a single, coherent measurement cycle, a capability not readily available in pulsed systems.

A significant technical advantage is the inherent and enhanced immunity to interference. While FMCW systems naturally filter non-correlated signals, the present method improves upon this by focusing the analysis on a specific signal segment and employing a predetermined function for distance mapping. This targeted approach provides substantially greater immunity to interference compared to both the temporal windowing of pulse radar and the conventional FFT-based processing of FMCW signals.

Additionally, the proposed aspects addresses and compensates for hardware non-linearities, a primary source of error in conventional FMCW systems. By using a predetermined function established during a calibration phase, the system learns the true, non-linear mapping between the waveform metric and the actual distance. This has the technical effect of automatically compensating for systematic distortions, such as chirp non-linearities, thereby achieving high accuracy without necessitating the use of more expensive, ideally linear hardware components.

BRIEF DESCRIPTION OF DRAWINGS

The drawings illustrate various embodiments of the present disclosure. These embodiments are provided to exemplify different aspects and aid in understanding the disclosure. It should be understood that, while the aspects of the disclosure has been illustrated and described in accordance with preferred embodiments, variations and modifications may be made without departing from the scope of the invention as defined by the claims.

DETAILED DESCRIPTION

Described herein are approaches and solutions for radar signal processing and distance estimation. Other approaches for radar signal analysis may employ Fourier-based processing and phase-based processing.

For Fourier-based processing. the beat signal is digitized, and a Fast Fourier

Transform (FFT) is performed to convert the time-domain signal into a frequency spectrum. A peak in this spectrum corresponds to the beat frequency, which is proportional to the target's distance. While robust, this frequency-domain analysis is subject to quantization effects, often called the picket-fence effect. The discrete nature of the FFT bins means that the true peak frequency may lie between two bins, which limits the precision of the distance measurement unless additional complex interpolation techniques are employed.

Furthermore, the FFT algorithm itself is computationally intensive, requiring significant processing power and memory.

As an alternative, phase-based methods have been developed. These techniques leverage the phase information of the beat signal, for example by comparing the phase across multiple FMCW ramps, to achieve potentially high-precision distance measurements. However, phase-based methods are known to be highly sensitive to system non-linearities. Any deviation from a perfectly linear frequency modulation of the transmitted signal can introduce significant phase errors, which can in turn lead to inaccuracies in the calculated distance.

The development of signal processing techniques is an ongoing endeavor in the field of FMCW radar systems. There is a general interest in developing alternative processing methods that might offer advantages in terms of computational efficiency or implementation simplicity, especially within the field of radar signal processing for short distance measuring. Therefore, further improvements in signal processing for FMCW radar systems are desirable.

Figure 1A:
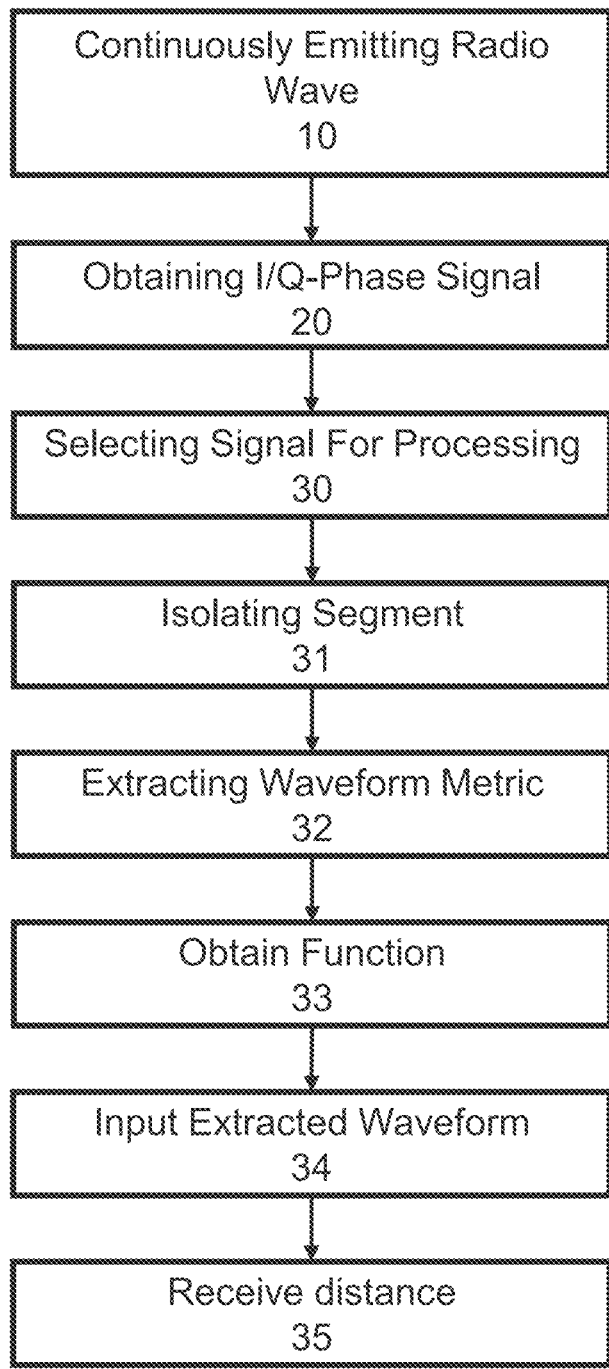
FIG. 1A illustrates a first aspect of a method according to the present disclosure.

According to a first aspect of the present disclosure, illustrated in FIG. 1, a method for estimating a distance between a FMCW radar sensor 1 and a target 2 is described. The radar sensor 1 comprises a transmitter 100, a receiver 200 and a signal processor 300. The method comprising the steps of:

emitting 10, by the transmitter 100, a radio wave which frequency is modulated over time;

obtaining 20, by the receiver 200, a time-domain in-phase signal and/or a time-domain quadrature-phase signal indicative of amplitude and phase information of an echo of the emitted radio wave;

selecting for processing 30, by the signal processor 300, the time-domain in-phase signal and/or the time-domain quadrature-phase signal;

isolating 31, by the signal processor 300, a segment of the selected time-domain in-phase signal and/or the time-domain quadrature-phase signal;

extracting 32, by the signal processor 300, a waveform metric from the isolated segment of the selected time-domain in-phase signal and/or the time-domain quadrature-phase signal;

obtaining 33, by the signal processor 300, a predetermined function defining a mapping between a plurality of waveform metrics and a corresponding plurality of distance values;

inputting 34, by the signal processor 300, the extracted waveform metric to the predetermined function;

receiving 35, by the signal processor 300, a distance outputted by the predetermined function.

The proposed method results in a more accurate and continuous distance estimation that overcomes the resolution and quantization limitations inherent in conventional FFT-based and phase-based methods.

By selectively processing only a specific segment of a single time-domain signal and using a morphological waveform metric, the method also achieves greater computational efficiency and reduced memory usage, making it suitable for real-time applications.

By modulating the frequency in a known pattern (i.e., a chirp) the method ensures that the time-domain characteristics of the received echo signal contain information that is predictably and systematically correlated with the target's distance.

The transmitter 100 is configured to continuously emit a radio wave, meaning that the transmitter 100 and receiver 200 operate simultaneously. This fundamentally eliminates the "minimum range blindness" that affects pulse-based radar sensors. In pulse-based radar, the receiver must be turned off while the high-power pulse is transmitted. If an echo from a very close object returns during this time, it is completely missed. Therefore, the aspects of the disclosure provides significantly higher accuracy and reliability for very short-range measurements in comparison to pulse-based radar systems.

Additionally, in contrast to pulse-based radar sensors, the doppler shift is a useful part of the measurement and not a parasitic effect to be filtered out. Meaning that, by using FMCW-based radars (e.g., radar sensors producing up- and down-chirps), it is possible to solve for both range and velocity simultaneously from a single, coherent measurement cycle. This is made possible since the up-chirp has a frequency corresponding to the range plus the doppler effect and the down-chirp has the frequency of the range minus the down-chirp. Therefore, the aspects of the disclosure eliminates the requirement to wait for multiple, widely spaced measurement periods to deduce velocity as required in pulse-based radars.

Furthermore, pulse-based radars, especially those operating in the mmWave range, are especially vulnerable to any interfering signal of sufficient power that arrives within its listening window, making pulse-based radars fundamentally susceptible to unsynchronized, pulsed interference.

In contrast, an FMCW system, an interfering signal will only produce a significant output if it correlates with the radar's own linear frequency chirp. A random, non-cooperative signal is extremely unlikely to do so. This provides a high processing gain that naturally filters out most forms of interference. The aspects of the disclosure further enhance this advantage by isolating a specific segment of the time-domain signal highly sensitive to distance and using a regression model to determine the distance based on a waveform metric within the specific segment. In result, the proposed method provides substantially greater immunity to interference compared to the temporal windowing of pulse radar and/or the FFT-based signal processing conventionally used for FMCW radars.

The aspects of the disclosure further addresses a challenge in FMCW radar design relating to maintaining the linearity of the frequency chirp. Non-linearities in components like power amplifiers and mixers distort the transmitted waveform. This distortion is a primary source of error in phase-based methods, which assume a perfectly linear relationship between time and frequency. It also degrades the performance of FFT-based methods by causing spectral leakage and peak broadening.

The aspects of the disclosure overcomes this limitation by decoupling the measurement from the assumption of perfect linearity. A core aspect of the solution lies in the use of a predetermined function (e.g., a regression model) to establish the relationship between the measured waveform metric and the actual distance. This function is generated during a calibration phase where the system's response is characterized across a range of known distances. The technical effect is that the regression model learns the true, non-linear mapping caused by the hardware's imperfections. Any systematic shift in the peak center location resulting from chirp non-linearities is automatically compensated for by the model, which maps the distorted input to the correct distance value. This provides a robust, practical solution that enhances accuracy without requiring ideally linear, and therefore more expensive, hardware components.

The proposed method allows for processing only one of the I or Q signals, the method thereby avoids the need to process both signals, which is often necessary in conventional phase-based techniques. Therefore, in preferred embodiments, the method comprises selecting for processing 30 one of the in-phase signal or the quadrature signal.

According to some embodiments, the isolated segment exhibits a consistent and monotonic variation with distance. Isolating 31 the segment preferably involves identifying one or more reference points within the selected time-domain signal. These reference points act as delimiters, defining the start and end boundaries of the segment for isolation. The selection of these points is preferably based on predetermined characteristics of the signal's morphology. Accordingly, in some embodiments, the method comprises isolating 30 a segment within the time-domain signal based on an isolation criterion.

The isolation criterion could be based on e.g., amplitude, slope, curvature, phase, or a combination thereof.

For example, isolated segment may be defined as the portion of the selected time-domain signal existing between two consecutive local minima.

In a preferred embodiment, the isolated segment is defined as a portion of the selected time-domain signal located between a first local minimum and a second subsequent local minimum; and, preferably, wherein the segment encompasses a signal peak. The first local minimum referring to the first local minimum identified in the time-domain signal. This segment provides an especially reliable basis for measurement as it has been found that this segment is highly sensitive to distance changes and comprise a very information-rich part of the signal.

To identify this segment any conventional method known to the skilled person may be used.

For example, the signal processor 300 may first scan the time-domain signal (or a absolute version thereof) to locate a local maximum (a peak) that satisfies a certain amplitude criterion to distinguish it from noise. Upon identifying a peak, the processor 300 searches backward in time from the peak's location to find the first preceding local minimum (a valley) and searches forward in time to find the first subsequent local minimum.

Alternatively, the signal processor 300 may define the segment as the continuous portion of the time-domain signal that lies above a predetermined amplitude threshold. The start of the segment may then be the point where the signal's rising edge crosses the threshold, and the end of the segment is the point where the signal's falling edge re-crosses the threshold. A hysteresis approach with two thresholds (an upper and a lower one) may be used to improve robustness against noise. The segment then starts when the signal rises above the upper threshold and ends only after it has fallen below the lower threshold.

Another option is that the signal processor 300 calculates the first derivative of the time-domain signal. It could then be defined that the points where the derivative is zero correspond to the signal's local maxima and minima. Alternatively, the points of maximum positive or negative slope can also serve as reference points. For instance, a segment could be bounded by the point of maximum positive slope (steepest ascent) and the point of maximum negative slope (steepest descent) within a single beat cycle.

Alternatively, the points where the time-domain signal crosses the zero-amplitude axis may act as reference points. The segment could be defined as the portion between two or three consecutive zero-crossings.

In embodiments, the waveform metric comprises at least a peak center location from the identified segment. By comparing between different waveform metrics it has been discovered that the peak center location provides the most stable parameter with the strongest, most linear correlation to distance. Using this specific metric makes the measurement less sensitive to noise, signal amplitude variations, and other environmental factors.

Alternatively, the waveform metric may comprise any waveform metric, such as the bandwidth or amplitude as referred to in the presentation of the working example.

In one proposed embodiment, the obtained time-domain I/Q-phase signal represents the amplitude and phase information of the received echo relative to a local oscillator signal. This ensures that the signal's morphological characteristics, such as the peak location, are fundamentally linked to the time-of-flight delay (T) and thus to the target distance.

According to embodiments, the predetermined function used to determine distance is a regression model. More specifically the regression model may be a polynomial regression based function. In some embodiments the polynomial regression based function is a third-degree polynomial regression based function.

The regression model enables accurate and continuous mapping from the measured waveform metric to a distance value. A polynomial regression model provides a computationally efficient and highly accurate function (as evidenced by the $R^2$ of 0.9997 provided in the Working Example) to translate the non-linear relationship between e.g., the peak center location and the true distance, overcoming the stepped, quantized output of prior art methods.

The proposed method does not rely on Fourier transformation or phase unwarping of the time-domain signal. Accordingly, according to one embodiment, the method is performed without phase unwrapping or Fourier transformation of the time-domain signal or values derived therefrom.

Obtaining 33 may be understood as the retrieval or accessing of said function by the signal processor 300 from a memory module 310. The predetermined function, which mathematically defines the mapping between waveform metrics and distance values, may be stored in various forms of computer-readable media, such as non-volatile memory (e.g., flash memory, EEPROM) or volatile memory (e.g., RAM), to which the signal processor 300 is operatively connected. Obtaining 33 may bedistinct from the act of determining 321 (e.g., creating or calibrating) the function itself; rather, it may include making the pre-existing, stored function available for execution by the processor. For example, this may involve loading the function's parameters or executable code into the processor's active workspace.

The action of "inputting" 34 may be understood to describe the action of providing the specific numerical value of the most recently extracted waveform metric as an argument to the obtained function. This is preferably an active computational step wherein the signal processor 300 passes the metric as a variable to the function for evaluation. In essence, the processor 300 may apply the measured data point to the mathematical model that the function represents.

Finally, the action of "receiving" 35 may refer to the acquisition of the output value that results from the execution of the function with the inputted waveform metric. Once the function has been evaluated, it yields a result—the estimated distance. The signal processor 300 may "receive" 35 this result in the sense that the calculated value is returned to a processor register or a specific memory address (e.g., the memory module 310), thereby making the final estimated distance available to the processor for subsequent use, such as for control actions, data logging, or display to a user. This act of "receiving" 35 the output may be interpreted the logical conclusion to the "inputting" 34 step, signifying the successful execution of the function and the retrieval of its computed result.

The formulation "continuously emitting" should preferably be construed to mean that the transmitter is engaged in an uninterrupted emission of the frequency-modulated radio wave throughout the defined modulation period. This does not necessarily imply that the emission is perpetual or without any intermission whatsoever. For instance, there may be brief intervals between successive frequency modulation ramps (chirps) for processing or other system functions. However, during the active sensing phase as defined by the "known pattern" of frequency modulation, the emission is uninterrupted.

In embodiments, the known pattern is characterized by a periodic frequency modulation, wherein the frequency of the emitted radio wave is intentionally and repeatedly swept across a defined bandwidth over a specific duration, hereafter referred to as the sweep time. This swept signal is commonly referred to as a "chirp." The exact nature of this frequency sweep can be non-linear, such as sinusoidal or exponential, or it can be linear, where the frequency of the signal changes at a constant rate.

In variations of this embodiment, the frequency modulation pattern is a linear frequency modulation, also known as a linear chirp. In this configuration, the frequency of the emitted wave increases or decreases at a constant rate (the chirp slope) over the sweep time. A common implementation of this is a sawtooth modulation pattern, wherein the frequency repeatedly ramps in one direction—either increasing from a start frequency to a stop frequency (an "up-chirp") or decreasing from a start frequency to a stop frequency (a "down-chirp")—before rapidly resetting to the start frequency to begin the next sweep.

In further variations of this embodiment, the known pattern is a triangular modulation pattern. This pattern is composed of at least two consecutive linear chirps with opposing slopes. For instance, a complete period of the triangular pattern comprises a linear up-chirp, where the frequency ramps from a start value to a stop value, immediately followed by a linear down-chirp, where the frequency ramps from the stop value back down to the start value. This specific pattern of sequential up-chirps and down-chirps may in some scenarios particularly advantageous as it enables the system to resolve the range and velocity of a target simultaneously and unambiguously by analyzing the distinct beat frequencies generated during each segment of the modulation.

According to embodiments, the emitted radio wave is emitted with a frequency of 30 to 300 GHz. Operating in the millimeter-wave (mmWave) frequency band enables high-resolution and high-precision distance measurements. The short wavelengths associated with this band ensure that the radar signal's characteristics are highly sensitive to small changes in distance, making the aspects of the disclosure particularly effective for the sub-millimeter accuracy applications described in the disclosure.

According to some embodiments, subsequent to selecting one of the at least one time-domain signals and prior to isolating a segment, the method further comprises:

calculating, by the signal processor, an absolute value of the selected time-domain signal to produce an absolute time-domain signal.

According to embodiments, the method comprises obtaining, by the receiver, a time-domain in-phase signal and/or a time-domain quadrature signal that represent the amplitude and phase information of an echo of the emitted radio wave relative to a local oscillator signal.

The present disclosure further provides a method for calibrating the FMCW radar sensor 1 to determine the "predetermined function" recited in aforementioned aspects. This calibration process establishes an accurate and robust empirical relationship between the waveform metric(s) extracted by the signal processor 300 and the actual physical distance to a target 2. The accuracy of the distance estimation method is contingent upon the integrity of this function, which may be established through the following calibration procedure.

The calibration method is performed by first executing the distance estimation method as set forth in aforementioned aspects. This execution is not performed at a single, unknown distance, but rather iteratively at a plurality of known, predetermined distances. For instance, a calibration procedure may be initiated in a controlled environment, such as a manufacturing facility or a laboratory. A target 2 with known, stable radar-reflective characteristics, such as a corner reflector or a metallic plate, is positioned at a first known distance, d1, from the FMCW radar sensor 1.

At this position, the sensor 1 is operated according to the method of aforementioned aspects. The transmitter 100 emits its frequency-modulated radio wave, the receiver obtains the echo signals, and the signal processor 300 selects the in-phase and/or quadrature signals. The processor 300 then isolates the segment within the time-domain signal and extracts the at least one waveform metric, hereinafter referred to as m1. This provides a first data pair (d1, m1).

This process is repeated for a plurality of different known distances (d2, d3, . . . , dn). The target 2 is moved, or the sensor 1 is repositioned, to each new known distance, and the process of acquiring the corresponding waveform metric (m2, m3, . . . , mn) is performed. The selection of known distances should preferably span the intended operational measurement range of the sensor 1 to ensure the resulting function is well-defined over its entire dynamic range. The set of collected data thus comprises a plurality of data pairs: {(d1,m1), (d2,m2), . . . , (dn,mn)}. With this plurality of acquired data pairs, the signal processor 300 then determines the predetermined function 321 itself. This step involves correlating the plurality of acquired waveform metrics with the corresponding plurality of known distances. The term "correlating" as used herein encompasses various mathematical techniques for establishing a functional relationship between two or more sets of data.

In one embodiment, determining the predetermined function 321 involves a curve-fitting algorithm. The signal processor 300 may apply a regression analysis, such as linear, polynomial, or exponential regression, to the collected data points (di,mi). The objective is to find a mathematical function, f, such that d=f(m), which minimizes the error between the function's output and the known distances for the given set of waveform metrics. The resulting equation of the best-fit curve is then stored as the predetermined function.

In another embodiment, the predetermined function may be embodied as a look-up table (LUT) stored in a memory accessible by the signal processor 300. The discrete data pairs (mi, di) are stored in the table. During a subsequent measurement operation, the processor 300 can use the LUT to find a distance corresponding to a measured waveform metric. To determine distances for waveform metrics that fall between the discrete points stored in the table, interpolation techniques, such as linear, spline, or polynomial interpolation, may be employed.

In yet another embodiment, the correlation may be performed by training a machine learning model, such as a neural network, a support vector machine, or a decision tree. The acquired data pairs {(di,mi)} serve as the training dataset, where the waveform metrics are the inputs and the known distances are the ground-truth outputs. The trained model itself then constitutes the predetermined function, capable of predicting a distance when provided with a new, previously unseen waveform metric.

Once determined, this function—whether an equation, an LUT, or a trained model—is stored electronically in a memory module 310 associated with the signal processor 300. It is this stored function that is subsequently applied during the normal operation of the sensor 1, as described in aforementioned aspects, to determine the distance to a target. This calibration process provides a robust means to account for component variations, manufacturing tolerances, and other system-specific characteristics, thereby enabling highly accurate and repeatable distance estimations.

Figure 1B:
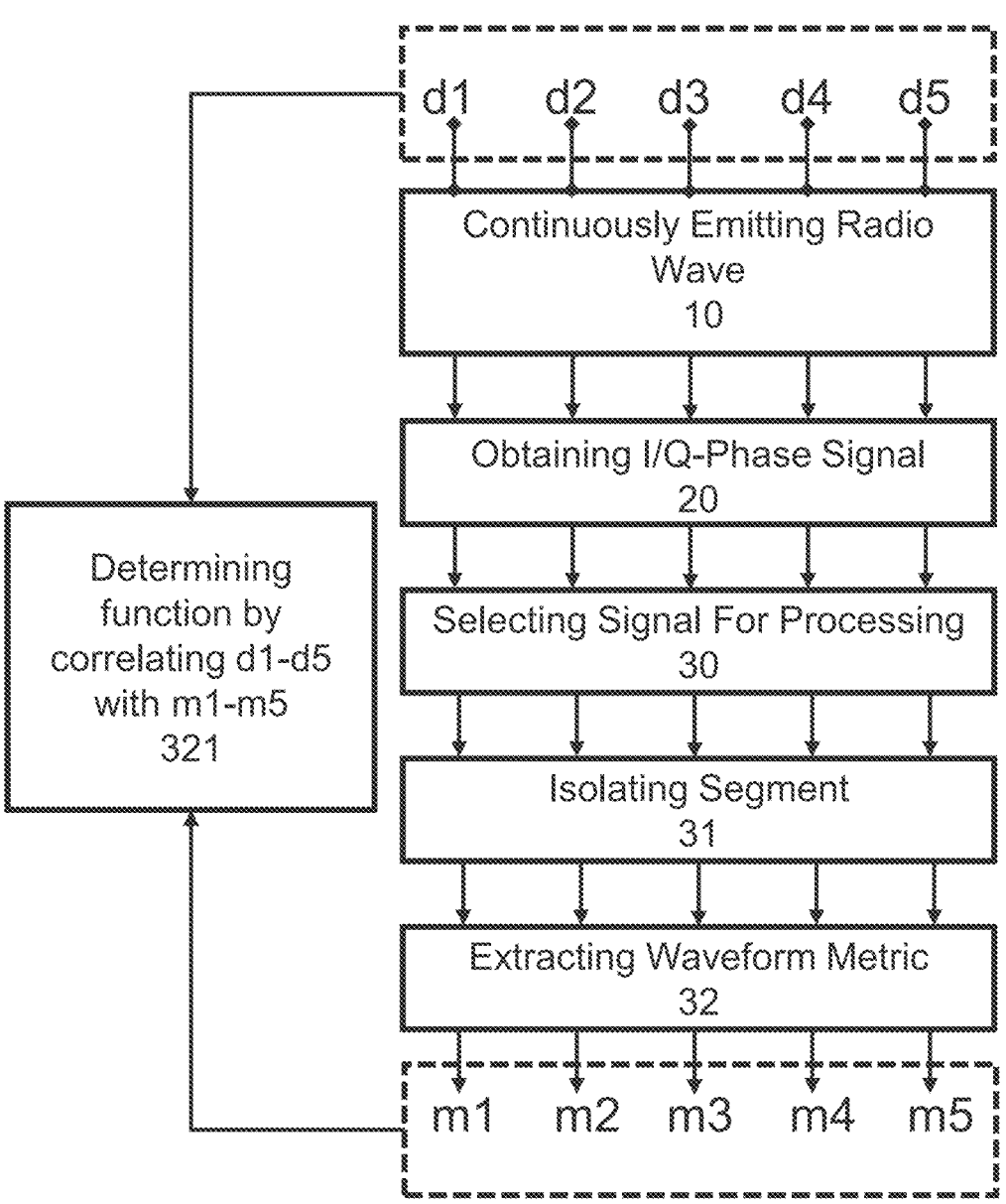
FIG. 1B illustrates a second aspect of a device according to the present disclosure.

In a second aspect, illustrated in FIG. 1B, there is proposed a method for calibrating a Frequency-Modulated Continuous-Wave (FMCW) radar sensor 1. The FMCW radar sensor 1 comprising a transmitter 100, a receiver 200 and a signal processor 300. The method comprises acquiring a plurality of waveform metrics corresponding to a plurality of known distances to a target. The method comprises, for each distance among the plurality of known distances:

emitting 10, by the transmitter 100, a radio wave, wherein the radio wave frequency is modulated over time;

obtaining 20, by the receiver 200, a time-domain in-phase signal and/or a time-domain quadrature-phase signal indicative of amplitude and phase information of an echo of the emitted radio wave;

selecting for processing 30, by the signal processor 300, the time-domain in-phase signal and/or the time-domain quadrature-phase signal;

isolating 31, by the signal processor 300, a segment of the selected time-domain in-phase signal and/or the time-domain quadrature-phase signal;

extracting 32, by the signal processor, a waveform metric from the isolated segment of the selected time-domain in-phase signal and/or the time-domain quadrature-phase signal;

The method further comprises:

determining 321, by the signal processer, a predetermined function by correlating the plurality of acquired waveform metrics with the corresponding plurality of known distances.

It shall be understood that the method of calibrating the FMCW radar sensor according to the second aspect may incorporate, mutatis mutandis, any of the features, details, or embodiments described hereinabove in connection with the first aspect. For example, the steps of emitting 10, obtaining 20, selecting for processing 30, isolating 31, and extracting 32 performed for each of the plurality of known distances may be executed in accordance with any of the specific embodiments disclosed. In particular, the step of isolating 31 the segment may be based on an isolation criterion, such as defining the segment as the portion of the signal located between two consecutive local minima. Likewise, the extracted waveform metric 32 may preferably comprise a peak center location. Furthermore, the radio wave may be emitted in the mmWave band and modulated according to a linear or triangular pattern, and the signal processor 300 may be configured to select only one of the in-phase or quadrature-phase signals and calculate its absolute value prior to isolating the segment, consistent with the preferred embodiments of the distance estimation method.

Figure 1C:
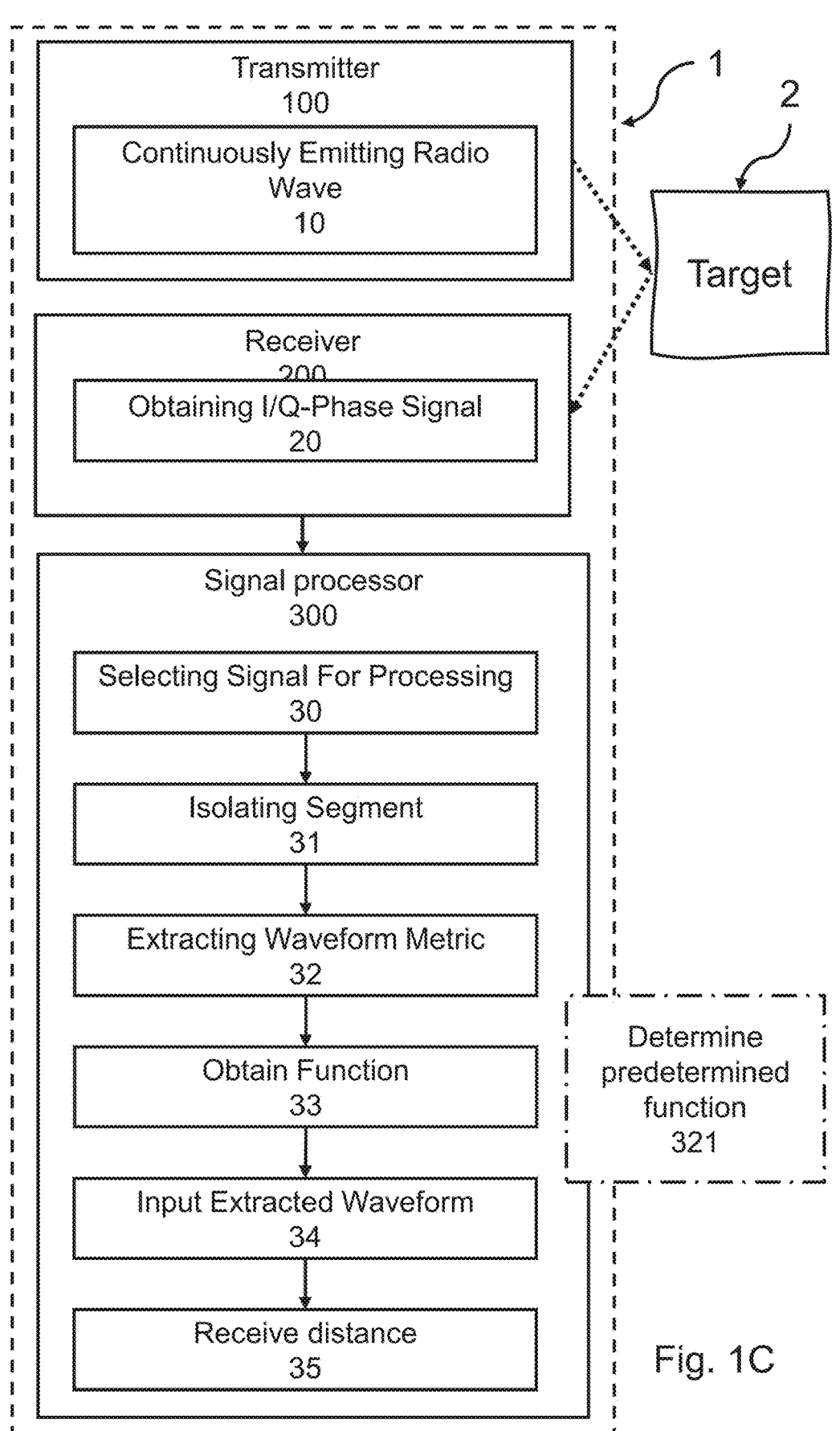
FIG. 1C illustrates a third aspect of a calibration method according to the present disclosure.

With reference to FIG. 1C, a schematic illustration of the calibration method according to the second aspect is provided. The calibration procedure leverages the measurement capabilities of the FMCW radar sensor 1 as described in the first aspect, performed iteratively at a plurality of known distances (d1,d2,d3,d4,d5).

At each respective known distance, di, the transmitter 100 emits a continuously emitting radio wave 10 and the subsequent echo is processed. From this processing, the signal processor 300 executes the step of extracting a waveform metric 32, yielding a corresponding waveform metric, mi. This process is repeated for each of the known distances, thereby generating a set of measurement pairs (d1,m1), (d2,m2), (d3,m3), (d4,m4), (d5,m5).

The plurality of known distances (d1, . . . , d5) and the corresponding plurality of extracted waveform metrics (m1, . . . , m5) are subsequently utilized in the step of determining the function 321. This step comprises correlating the set of known distances with the set of corresponding waveform metrics. The output of this correlation is the predetermined function, which defines the relationship between a given waveform metric, m, and the physical distance, d, to the target 2. This predetermined function is then stored and subsequently used in the distance estimation method of the first aspect.

In a third aspect, illustrated in FIG. 1C, there is proposed a Frequency-Modulated Continuous-Wave (FMCW) radar sensor 1. The FMCW radar 1 comprising a transmitter 100 and receiver 200. The transmitter 100 being configured to continuously emit 10 a radio wave which frequency is modulated over time in a known pattern. The receiver 200 being configured to obtain 20 at least one time-domain signal that represents the amplitude and phase information of an echo of the emitted radio wave relative to a local oscillator signal. The FMCW radar 1 further comprising a signal processor 300 operatively connected to the receiver, and being configured to:

select for processing 30 the time-domain in-phase signal and/or the time-domain quadrature-phase signal;

isolate a segment 31 within the selected time-domain in-phase signal and/or the time-domain quadrature-phase signal;

extract a waveform metric 32 from the isolated segment of the selected time-domain in-phase signal and/or the time-domain quadrature-phase signal; and obtaining 33, by the signal processor, a predetermined function defining a mapping between a plurality of waveform metrics and a corresponding plurality of distance values;

inputting 34, by the signal processer, the extracted waveform metric to the predetermined function;

receiving 35, by the signal processor, a distance outputted by the predetermined function.

The constituent components of the FMCW radar sensor 1 according to the third aspect, particularly the signal processor 300, may be configured to operate in accordance with any of the specific embodiments or methods described in relation to the first aspect. For instance, the signal processor 300 may be specifically configured to isolate the segment 31 by identifying reference points based on a predetermined criterion, such as amplitude thresholds, derivative zero-crossings, or, preferably, the local minima bracketing a signal peak. Similarly, the signal processor 300 may be configured to extract the peak center location as the specific waveform metric 32 and to utilize a polynomial regression model, such as a third-degree polynomial function, as the predetermined function. Moreover, the transmitter 100 may be configured to emit a linear or triangular chirp, and the entire system may be configured to operate without performing phase unwrapping or Fourier transformation, thereby embodying the computational efficiencies and advantages described hereinabove.

Figure 2:
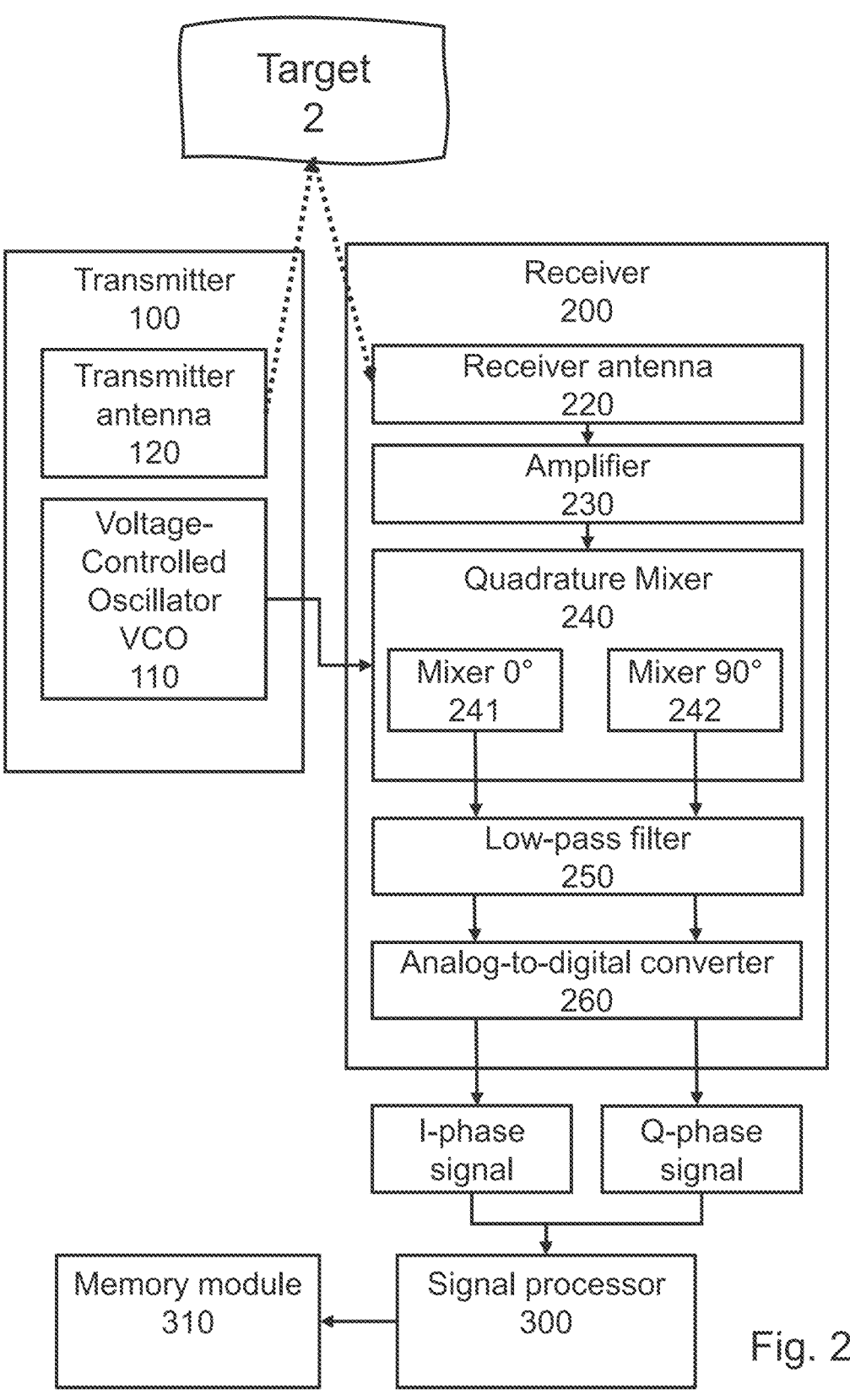
FIG. 2 illustrates a example for configuration of components in a FMCW radar sensor.

FIG. 2 illustrates one possible configuration of the specific components used in the transmitter 100 and receiver 200 of the aforementioned aspects. It should be noted that any configuration of components used for designing FMCW radar sensors and obtaining I/Q-phase signal's known to the skilled person may be used for the implementing aspects of the present disclosure and that FIG. 2 merely provides one such example.

The transmitter 100 comprises a Voltage-Controlled Oscillator (VCO) 110. In a practical embodiment, the VCO 110 is typically operatively coupled to a waveform generator (not shown) that provides a control voltage, thereby causing the VCO 110 to generate a transmission signal with a linearly varying frequency, known as a chirp. The output of the VCO 110 is typically amplified by a power amplifier (PA) (not shown) to ensure sufficient transmission power for the desired detection range. The amplified transmission signal may then conveyed to a transmitter antenna 120, which is configured to continuously emit radio waves towards a target 2.

A portion of the signal generated by the VCO 110 may be routed to the receiver 200 to function as a local oscillator (LO) signal. This routing is typically effected by a power splitter or directional coupler (not shown).

The receiver 200 comprises a receiver antenna 210 configured to capture the signal reflected from the target 2. In the illustrated example, the captured received signal is subsequently conveyed to an amplifier 220. To maximize receiver sensitivity, the amplifier 220 is preferably a Low Noise Amplifier (LNA), designed to amplify the weak received signal while introducing a minimal amount of noise.

The amplified received signal may then fed into a Quadrature Mixer 230. The Quadrature Mixer 230 is preferably configured to perform homodyne down-conversion by mixing the amplified received signal with the LO signal derived from the VCO 110. The Quadrature Mixer 230 comprises a first mixer (0°) 231 and a second mixer (90°) 232. The first mixer 231 multiplies the received signal with the LO signal, thereby generating a baseband signal referred to as the I-phase signal. The second mixer 232 multiplies the received signal with a 90-degree phase-shifted version of the LO signal, thereby generating a second baseband signal referred to as the Q-phase signal.

The resultant analog I-phase and Q-phase signals are passed through at least one Low-Pass Filter 240, which is configured to remove unwanted high-frequency products and noise. The filtered analog signals are subsequently digitized by an Analog-to-Digital Converter (ADC) 250. The ADC 250 outputs digitized I-phase and Q-phase signals, which are representative of the amplitude and phase information of an echo of the emitted radio wave.

Frequency-Modulated Continuous Wave (FMCW) radar transmits a continuous waveform whose frequency increases (or decreases) linearly over time, forming a chirp. When the chirp signal reflects from a target, the received signal is delayed in time by:

$$\tau = \frac{2R}{c} \tag{1}$$

where R is the round-trip distance to the target and c is the speed of light. The transmitted signal can be written as:

$$s_t(t) = \cos\left(2\pi\left(f_0 t + \left(\frac{S}{2}\right)t^2\right)\right) \tag{2}$$

where $$S = \frac{df}{dt}$$

is the rate of change of frequency over time during a chirp, measured in Hz/s.

The received signal is:

$$s_r(t) = \cos\left(2\pi\left(f_0(t-\tau) + \left(\frac{S}{2}\right)(t-\tau)^2\right)\right) \tag{3}$$

Mixing the transmitted and received signals produces a beat signal with a frequency:

$$f_b = S \cdot \tau = \frac{2RS}{c} \tag{4}$$

Distance is then extracted as:

$$R = \frac{cf_b}{2S} \tag{5}$$

In practice, the mixed signal is digitized into its in-phase (I) and quadrature (Q) components, forming a complex signal:

$$Z(t) = I(t) + jQ(t) \tag{6}$$

The instantaneous phase of this complex signal is:

$$\phi(t) = \arctan\left(\frac{Q(t)}{I(t)}\right) \tag{7}$$

The phase difference over a single chirp can also be used to estimate the range. Assuming a linear phase progression due to a single dominant target, the distance can be calculated from the unwrapped phase $\phi$ as:

$$R = \frac{c\phi}{4\pi f_c} \tag{8}$$

where $\phi$ is the measured phase difference between transmit and receive signals, fc is the radar center frequency. This phase-based method enables sub-wavelength distance estimation and is especially useful for detecting very small displacements.

Figure 3:
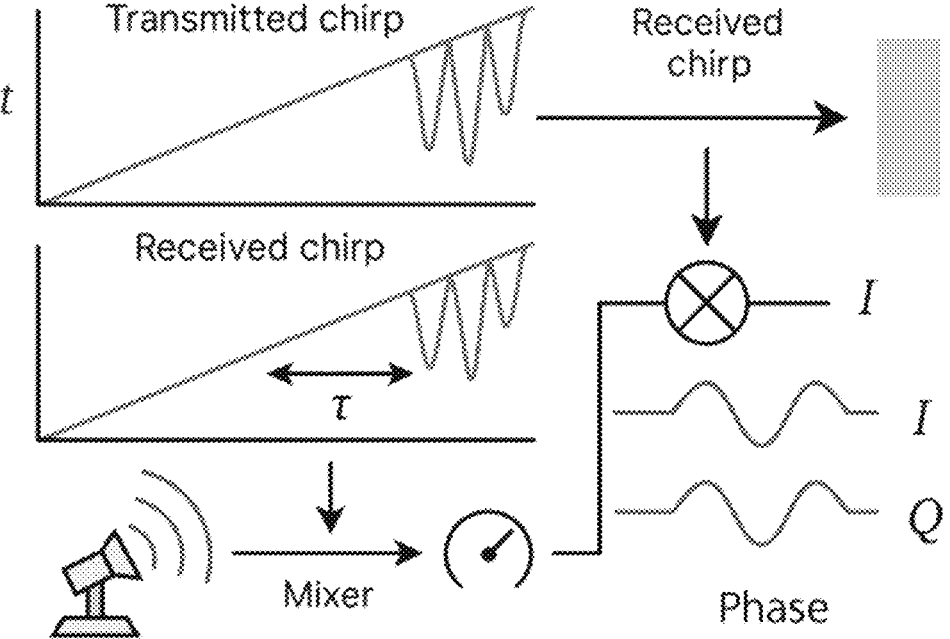
FIG. 3 illustrates the general principles of operation for a FMCW radar.
Figure 4:
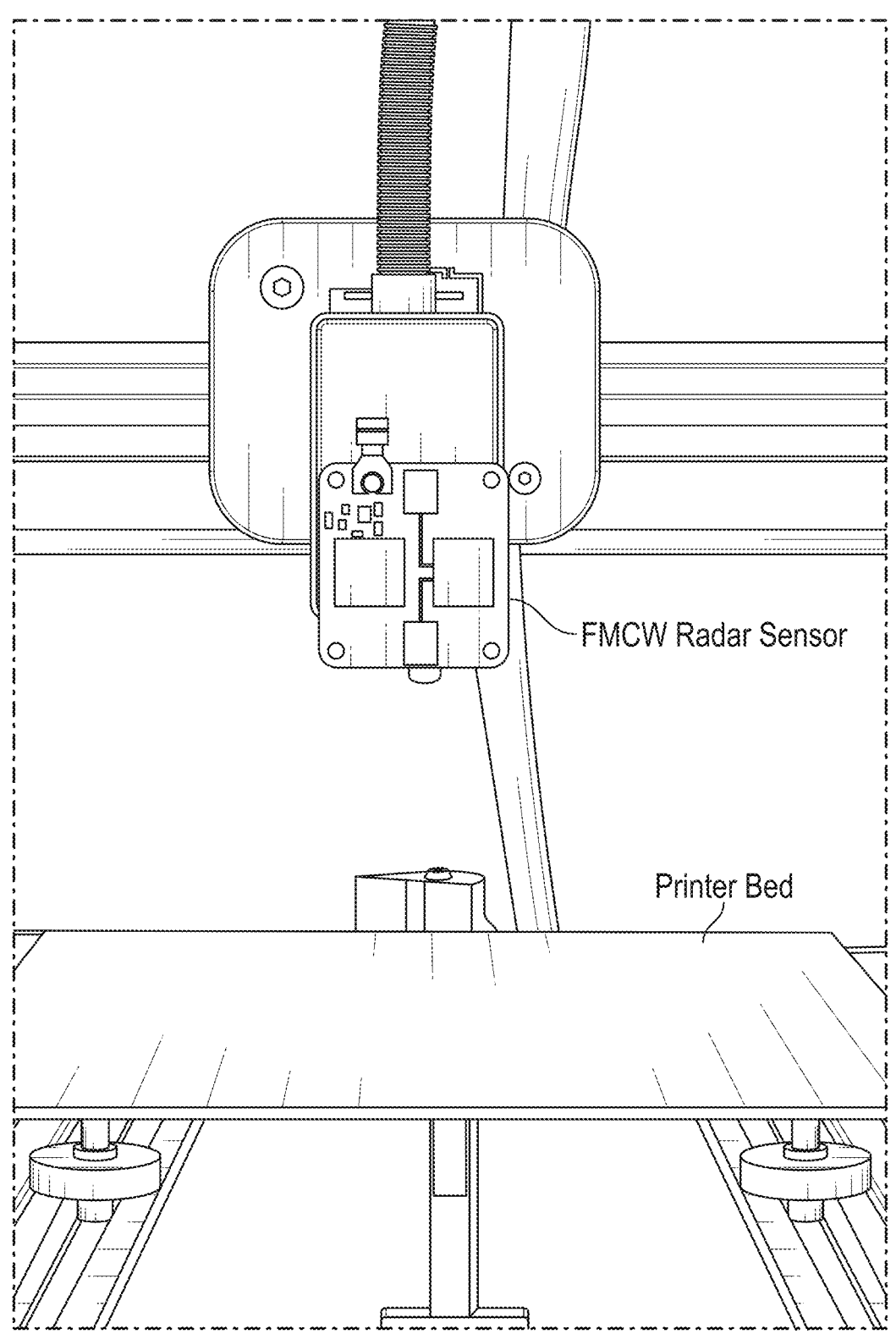
FIG. 4. Shows the experimental setup used in the presented working example.

The principle of operation of FMCW radar for distance estimation is illustrated schematically in FIG. 3. It worth to mention that in FMCW radar, the transmitted signal begins at a starting frequency known as $f_0$, which marks the beginning of each frequency-modulated chirp. The frequency of this chirp increases linearly over time, sweeping across a defined bandwidth. The center of this frequency sweep is referred to as the carrier or center frequency, denoted $f_c$. This center frequency is particularly important when using phase information to improve measurement accuracy, especially for detecting very small distance changes. When the transmitted signal reflects off a target and returns to the radar, it is slightly delayed in time due to the distance it traveled. Mixing the received signal with the ongoing transmitted chirp creates a beat signal whose frequency, called the beat frequency ($f_b$), is directly related to how far the signal has traveled. This beat frequency is the main feature used to estimate the distance to the target. Therefore, $f_0$, $f_c$, and $f_b$ are all interconnected within the FMCW radar processing chain, linking signal generation, phase analysis, and distance estimation.

While the illustrative embodiments of the disclosure have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

Working Example

A working example, explained with reference to FIG. 4-12, was designed and utilized to demonstrate the advantage of detecting distance variations using the disclosed method in comparison to previously known methods. In this setup, a Frequency Modulated Continuous Wave (FMCW) radar sensor (i.e., a radar sensor emitting a radio wave which frequency is modulated over time in a known pattern) was mounted on the print head of a 3D printer. The distance from the FMCW radar sensor to the printer bed (i.e., the target) was systematically varied from 1 cm to 17 cm. The configuration of this experimental setup is further illustrated in the accompanying FIG. 4.

The FMCW radar sensor employed was a SiRF radar module from Indie Semiconductor. This radar sensor operated over a 1 GHz bandwidth, covering the frequency range from 122 GHZ to 123 GHz. During operation, each frame of acquired in-phase (I) and quadrature (Q) signals contained 512 samples. These samples were captured with a temporal resolution (At) of 1.95 picoseconds. The radar sensor was interfaced with a laptop computer (i.e., a device comprising a signal processor) via a Universal Serial Bus (USB) connection for data acquisition and control.

Figure 5:
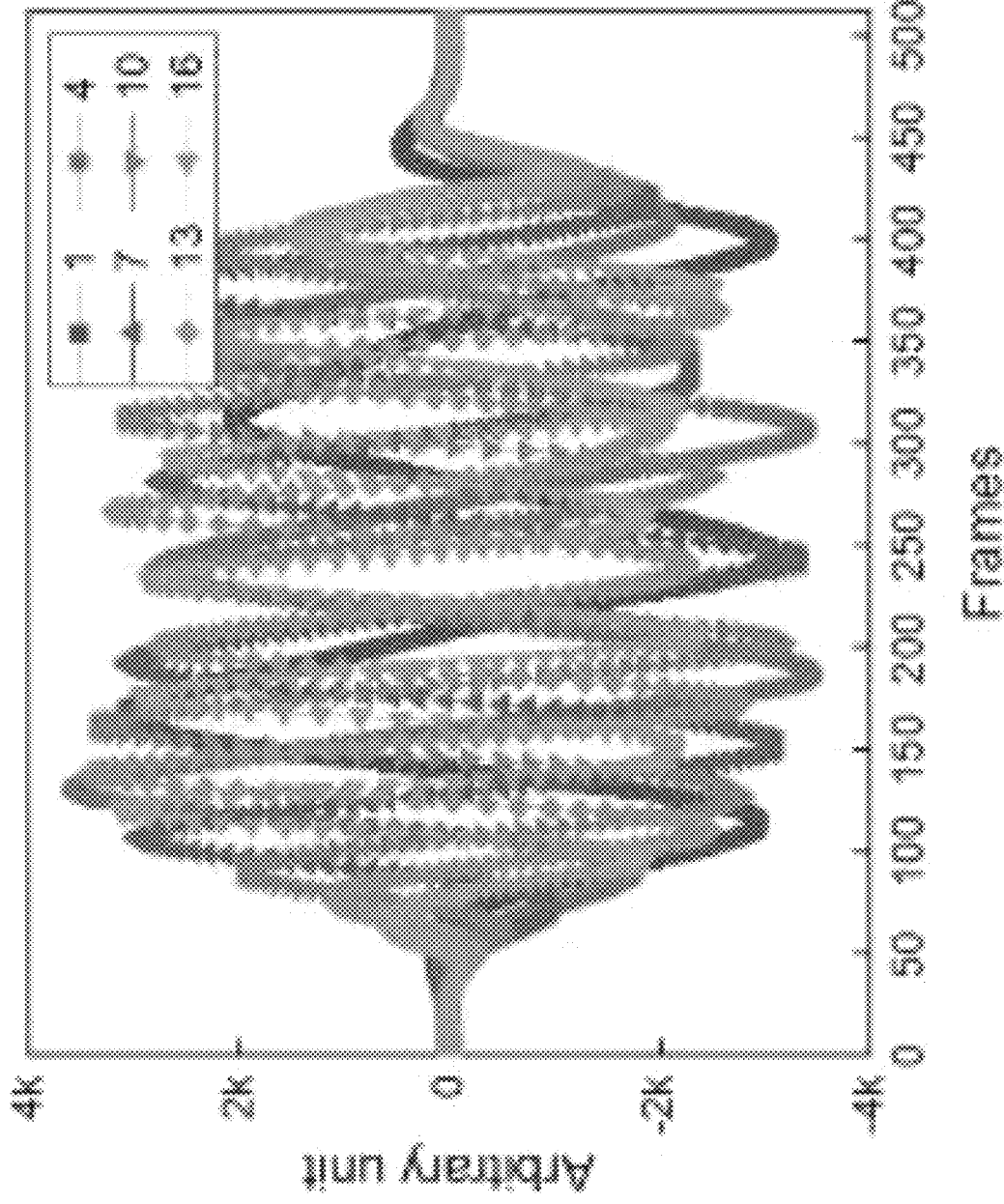
FIGS. 5 and 6 show time-domain measurements of radar signals at selected distances for the working example.
Figure 6:
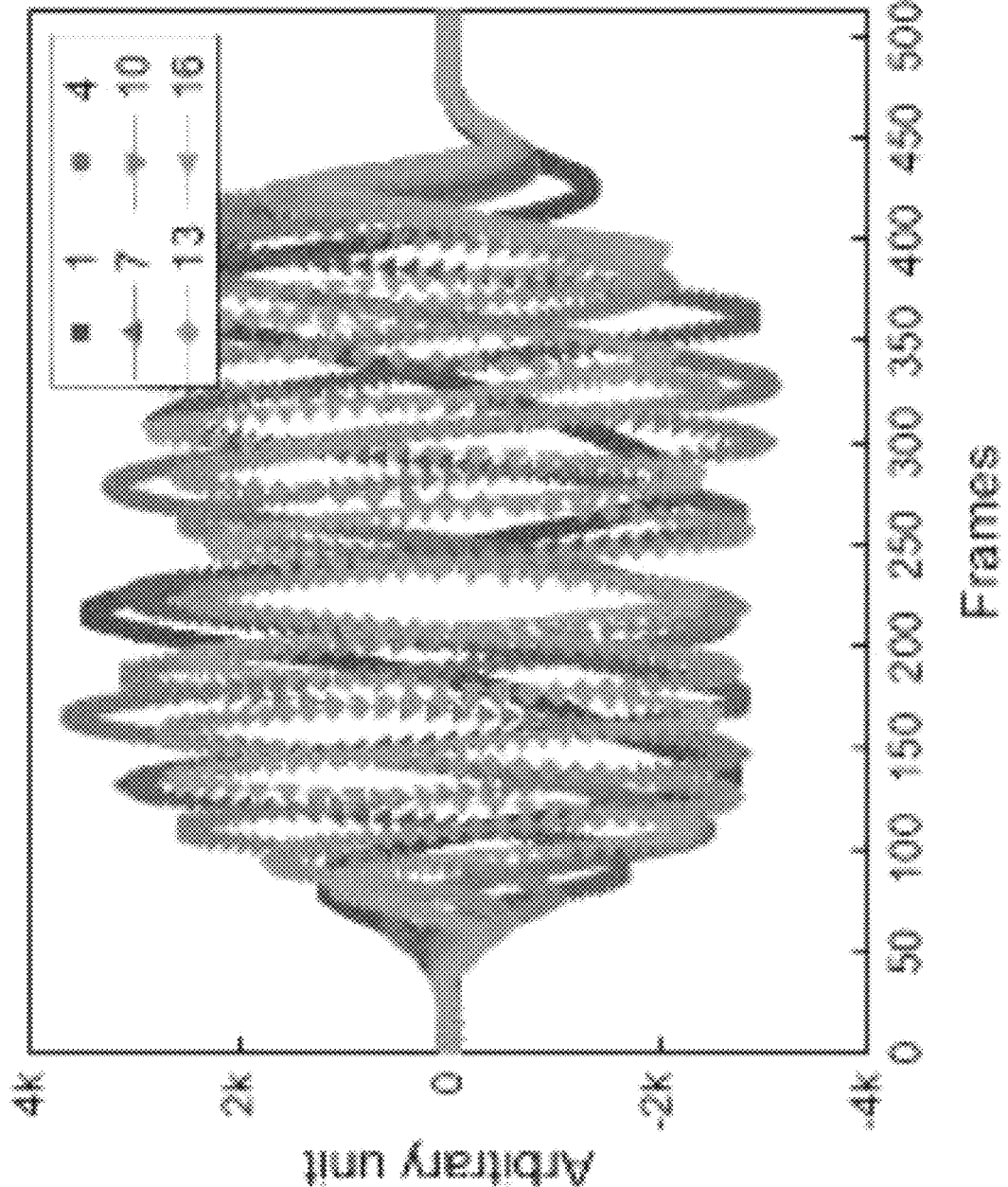

The laptop was configured using conventional methods to acquire time-domain I and Q signal data from the radar sensor. The resulting I signals and Q signals, corresponding to the various tested distances, are shown in FIG. 5 and FIG. 6, respectively. Each curve depicted therein represents the average of 135 individual measurements conducted for each specific distance, providing a clear representation of the Analog-to-Digital Converter (ADC) output signals over time.

As seen in FIG. 5 and FIG. 6, the in-phase (I) signals and the quadrature (Q) signals exhibited distinct patterns that varied noticeably with the distance between the radar sensor and the printer bed. This variation illustrates the radar sensor's sensitivity to positional changes. As illustrated, each signal trace exhibit a modulated waveform and the complexity of the waveform and its phase shift increases as the distance from the radar sensor to the printer bed increases.

Notably, both the amplitude envelope and the frequency content of the I and Q signals varies with distance. This indicates that the distance has a measurable and distinguishable impact on the temporal evolution of these signals. The distinct observed features of these signals (such as, peak alignment, waveform curvature, and/or oscillation density) demonstrate that both the I and Q signals contained rich information which could be utilized for accurate distance estimation.

Furthermore, the consistency observed in the shifting pattern of the signals across the increasing distances demonstrates the radar sensor's sensitivity and supports the feasibility of using the waveform of the signals for regression-based range estimation.

Figure 7:
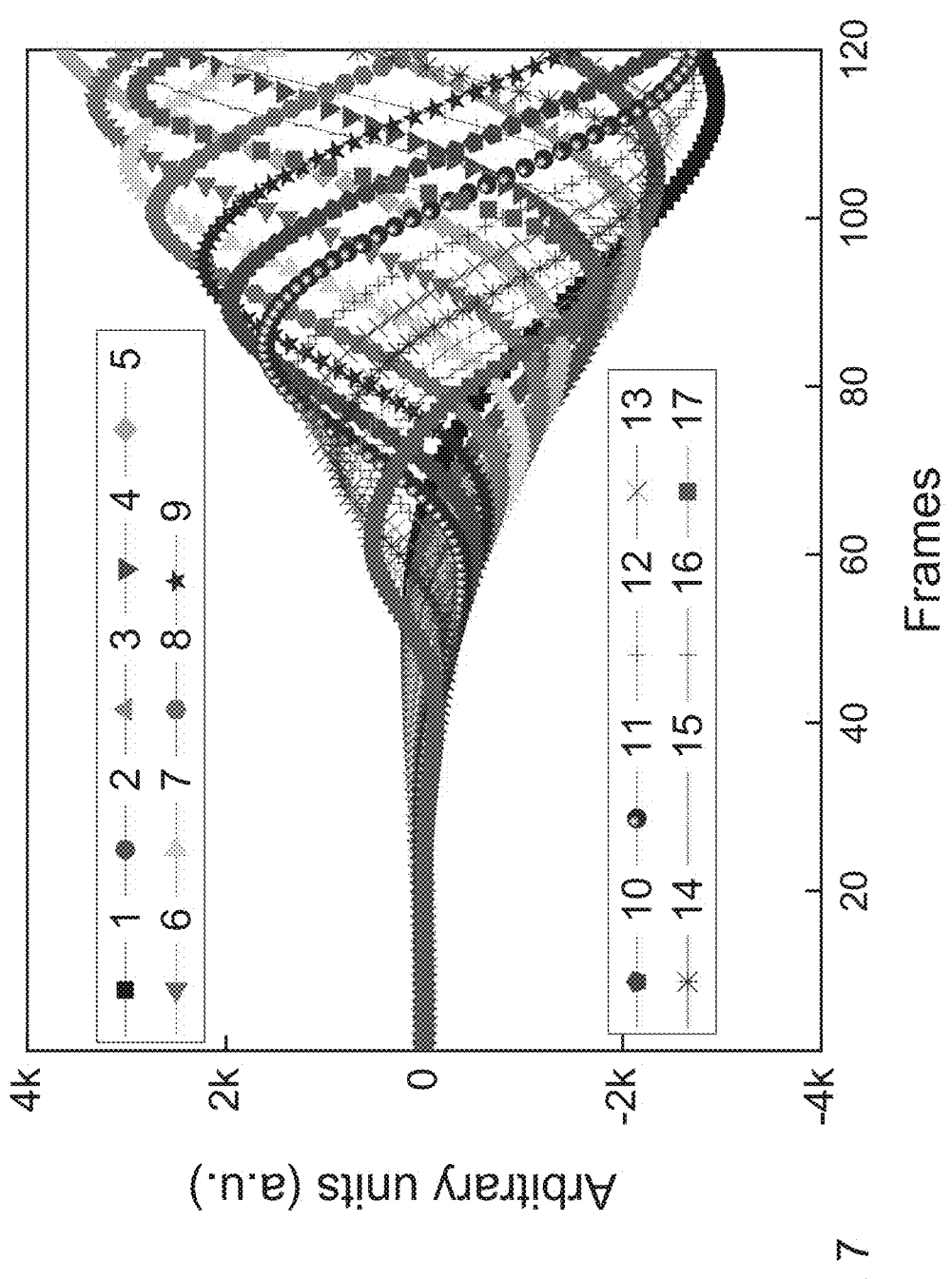
FIG. 7 show the in-phase time domain measurement at selected distances for the working sample.

FIG. 7 presents the in-phase (I) time-domain signals acquired using FMCW radar for distances ranging from 1 cm to 17 cm, in 1 cm increments. Each colored and marked trace corresponds to a specific distance, as indicated in the legend. FIG. 7 thus illustrates how the waveform morphology changes with distance: as the target moves farther from the radar, the oscillatory patterns become more pronounced and shift in phase and amplitude. As can be seen, the signals exhibit increasing delay and oscillation spread with larger distances, reflecting the increased time-of-flight and modulation depth captured by the radar. The variation in in-phase signal shape across distances demonstrates that specific waveform features can be reliably correlated with distance and provides a strong basis for model-based distance estimation.

Figure 8:
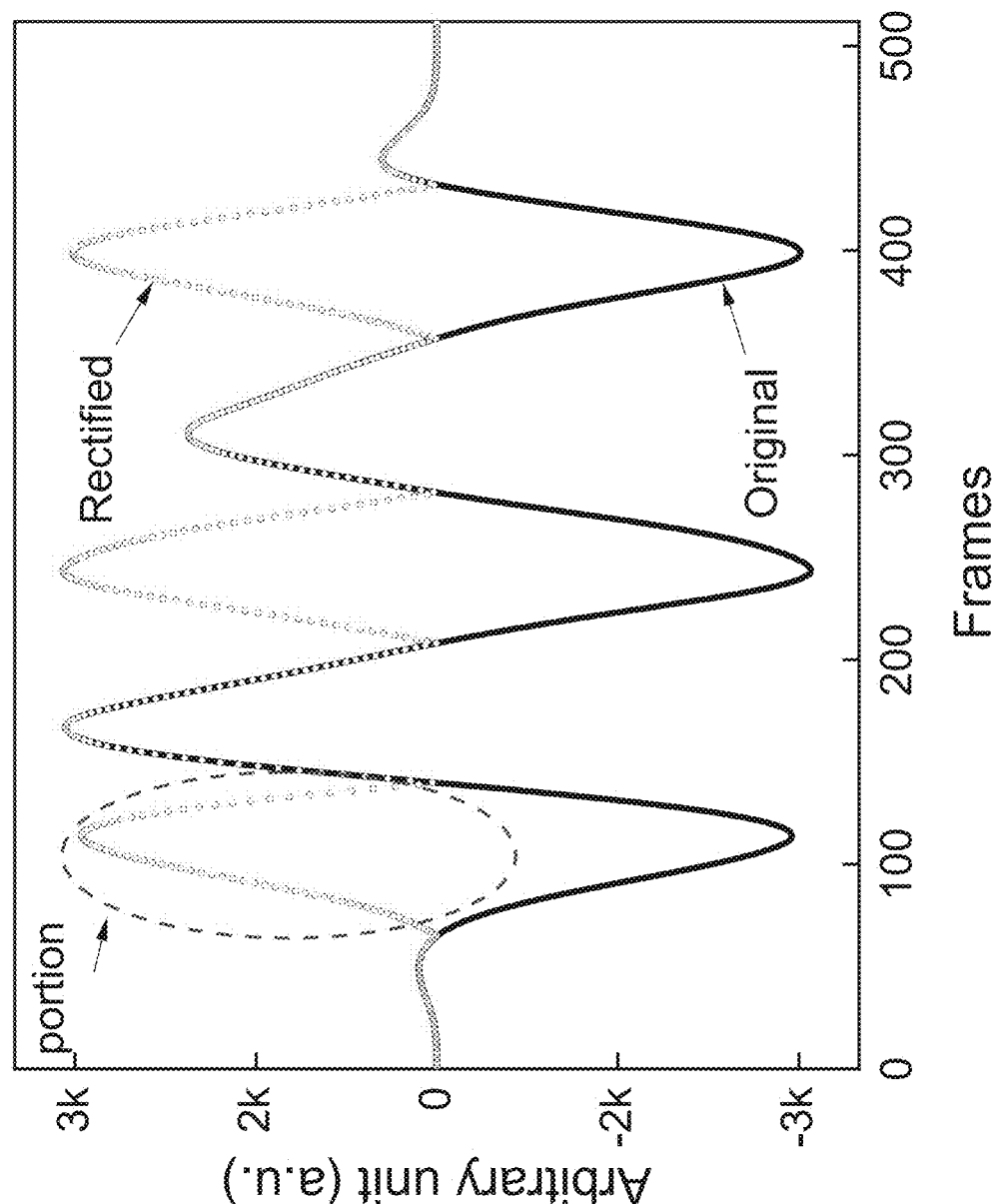
FIG. 8 shows a rectified in-phase signal highlighting a specific segment for the working example.

A specific segment of the in-phase signal was isolated for further analysis. More specifically, the segment encompassing the peak between the first and second local minima, as illustrated in FIG. 8 in the form of a region marked with dotted points, is isolated for further analysis due surprising discovery that this regions has consistent and improved sensitivity to distance variations.

Figure 9:
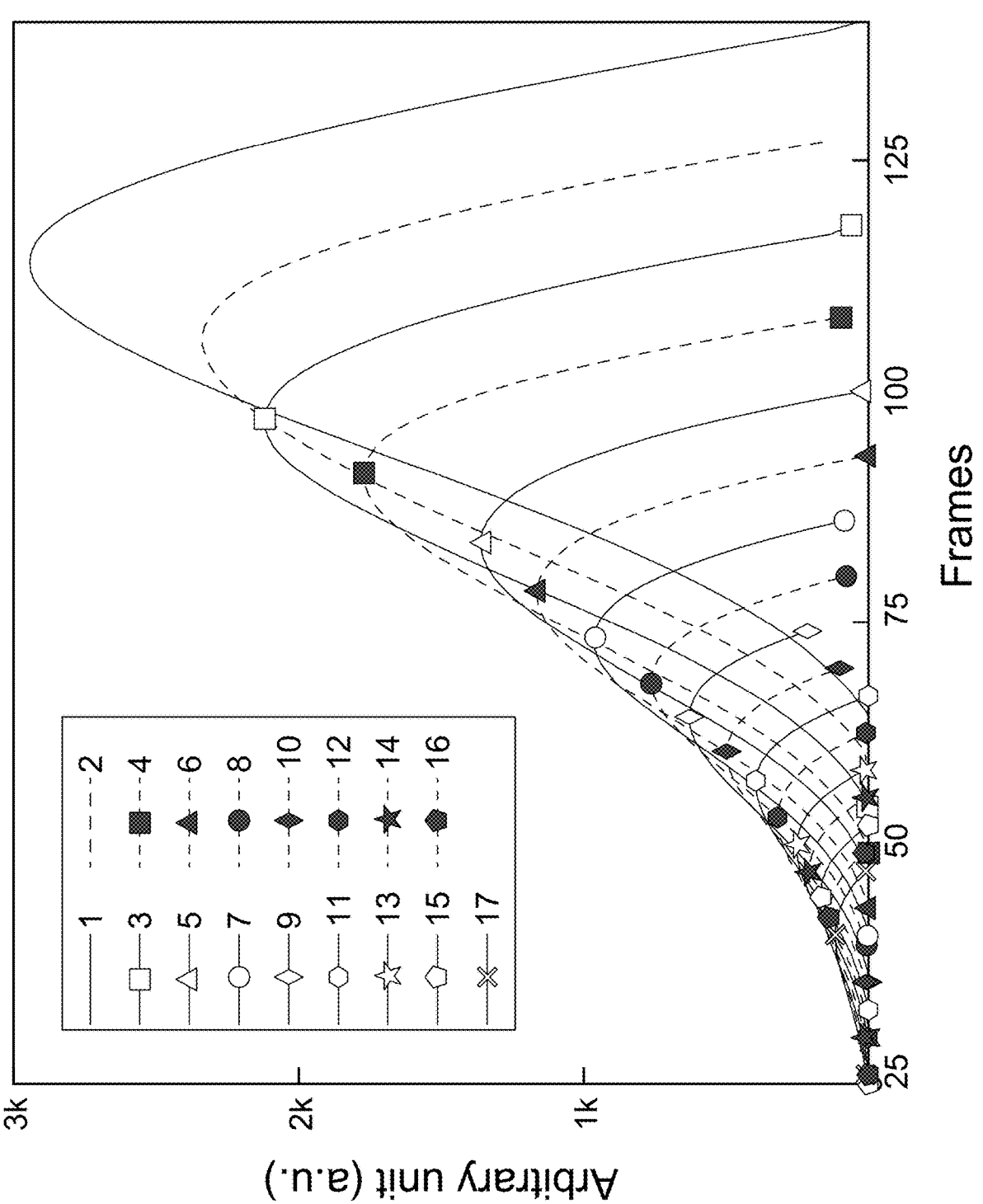
FIG. 9 shows signal cropping of the measured absolute I-signals for the working example.

FIG. 9 presents the isolated in-phase (I) signal segments corresponding to target distances. Each waveform depicts the portion of the absolute I-signal bounded by the first and second local minima. With increasing target distance, the amplitude of the received in-phase signal systematically decreases, accompanied by a downward shift in the peak magnitude. This behavior is consistent with the expected free-space path loss and energy dispersion over distance. The illustrated systematic variation demonstrates the strong dependency of the signal's morphological characteristics sensitivity to range changes.

Figure 10:
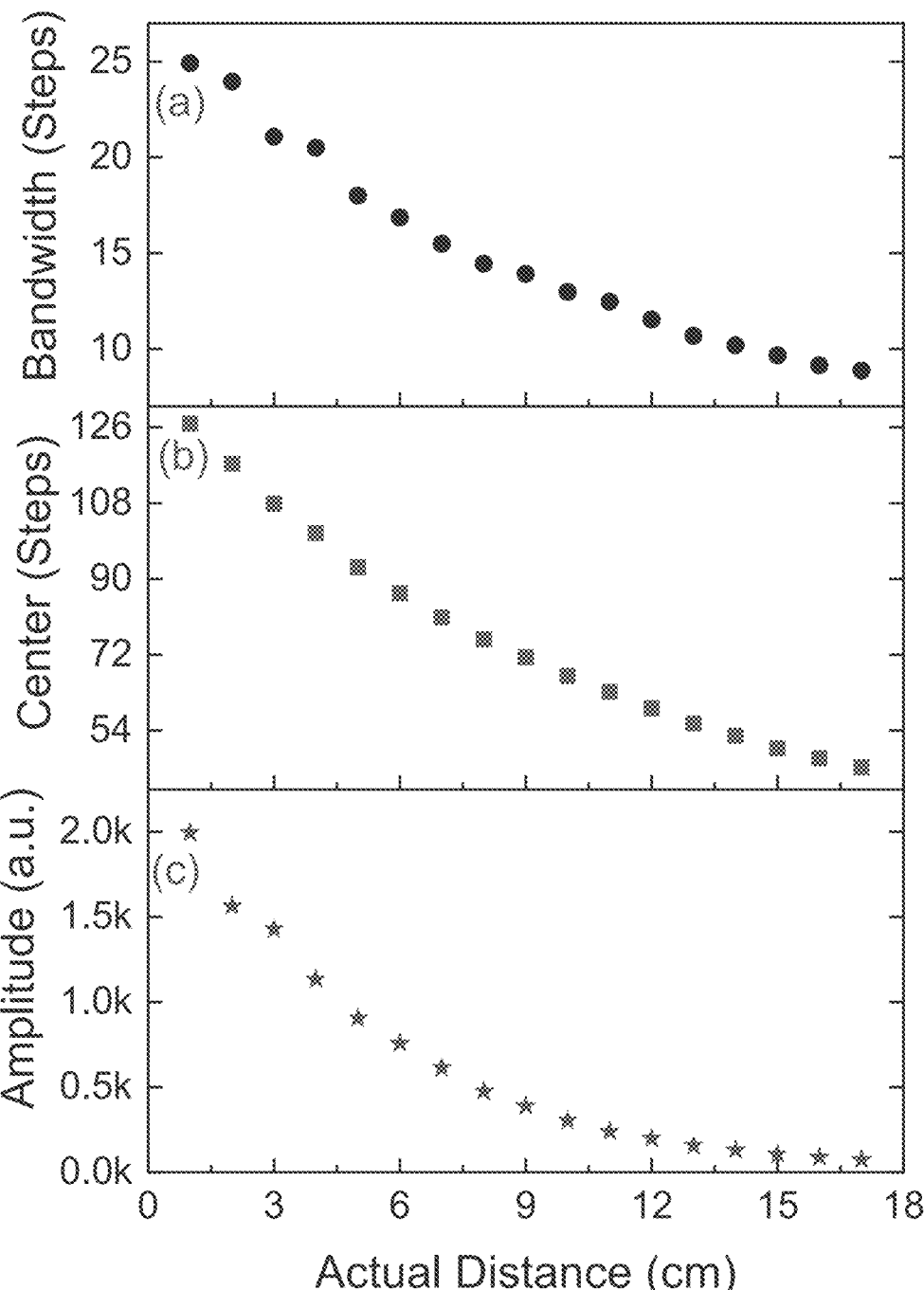
FIG. 10 shows extracted signal parameters for different waveform metrics for the working example.

FIG. 10 illustrates the variation of key waveform metrics—bandwidth, peak center location, and amplitude—with respect to target distance. Subplot (a) shows a measured reduction in signal bandwidth as the distance increases, suggesting temporal signal compression. Subplot (b) reveals a systematic shift in the peak location, corresponding to increased signal delay with greater range. Subplot (c) presents a gradual decrease in signal amplitude, consistent with propagation losses over longer distances. These monotonic trends emphasize a strong correlation between signal characteristics and actual distance.

Among the three parameters, the peak center location demonstrates the most consistent and near-linear relationship with target range, indicating its advantage as a reliable distance predictor. Its low sensitivity to noise and environmental disturbances enhances its robustness in practical scenarios.

While bandwidth also varies smoothly with distance, it may be more susceptible to distortions, especially at larger ranges. Amplitude, although decreasing with distance, is less dependable due to its higher sensitivity to external factors such as reflection strength and environmental conditions.

Taken together, these findings establish a solid foundation for parameter-based distance estimation. By mapping the extracted features to known distances, this method enables continuous and accurate range prediction across a wide span of measurements, with the peak center location emerging as the most effective and stable indicator.

Figure 11:
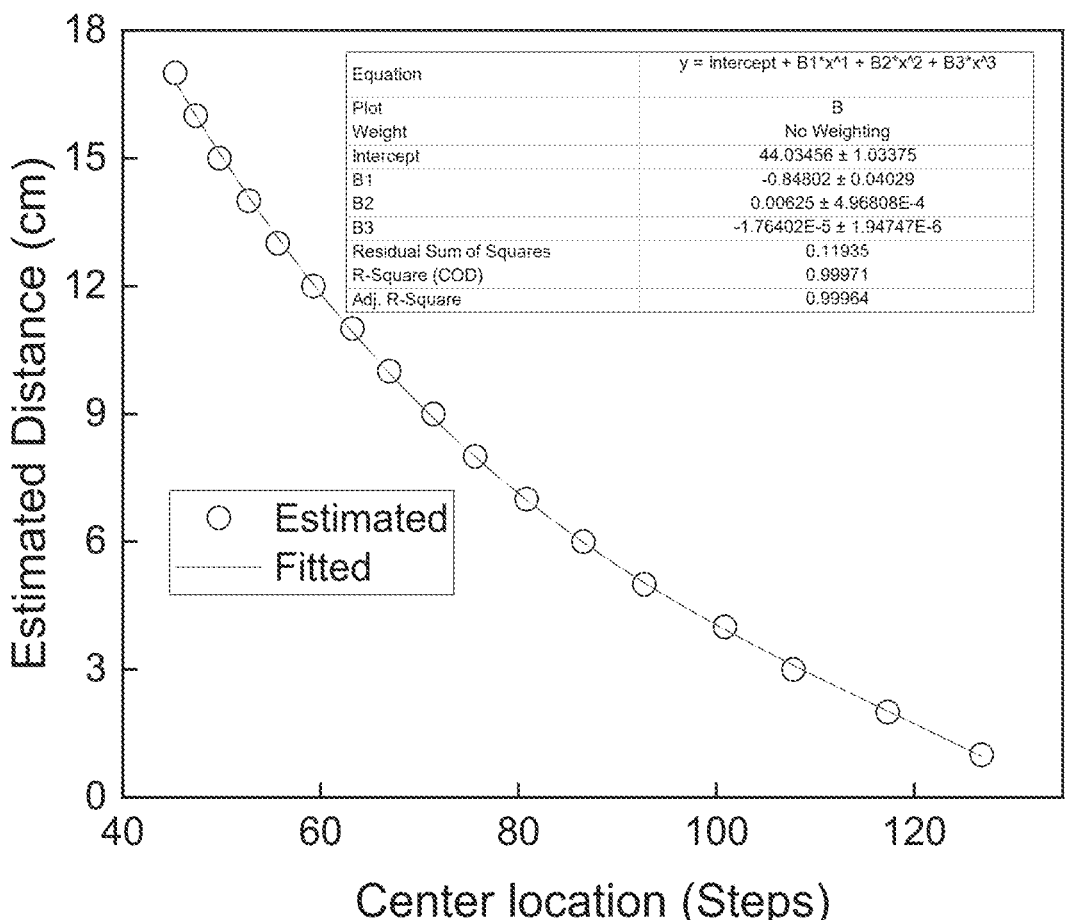
FIG. 11 shows polynomial curve fitting between the extracted peak center location and actual distance for the working example.

In the working example, a third-degree polynomial model was employed to map the estimated signal parameter to the actual distance, as shown in FIG. 11. The circular markers represent the extracted parameter values from the measured signals, while the solid curve denotes the fitted polynomial. The fitted equation demonstrates an excellent match with the data, as indicated by the high coefficient of determination ($R^2 = 0.9997$) and a low residual sum of squares (0.1195).

The results illustrated on FIG. 11 validate the reliability of the polynomial regression in capturing the nonlinear trend between the extracted parameter and distance, thereby enabling accurate and continuous distance estimation across the entire measured range. The relationship between distance and the center location of the signal does not suffer from the limited resolution or plateau effects observed in FFT- and phase-based methods, where estimates often remain unchanged across several true distance increments.

Furthermore, the polynomial regression model effectively maps the extracted center location to actual distances, facilitating accurate and continuous range estimation. The estimated distance, derived from the signal's center location, can be contextually mapped to a variety of high-precision sensing applications. These include surface profiling, material deformation monitoring, micro-displacement detection, and precision positioning—particularly in scenarios where sub-millimeter accuracy is critical.

A comparable processing approach can be applied to the quadrature (Q) signal, producing similarly reliable results. Since the in-phase (I) and quadrature (Q) components are orthogonal projections of the same radar return, the segment-based analysis and parameter extraction performed on the Q signal also demonstrate strong correlation with distance. This confirms the robustness and generalizability of the proposed method across both signal channels.

Furthermore, the methodology is not necessarily limited to the specific segment analyzed; it may optionally be extended to any portion of the radar signal that exhibits a consistent and monotonic variation with distance. This adaptability enhances the approach's versatility, making it suitable for a broad range of sensing configurations and applications. The proposed approach can also be validated for shorter target distances. By applying the same signal segmentation and parameter extraction methodology to measurements at sub-centimeter ranges, its effectiveness in detecting fine-scale displacement can be further confirmed. This highlights the method's high resolution and suitability for precision sensing tasks that require accurate distance estimation at very close ranges.

Comparison to Conventional FFT-Based and Phase-Based Methods

The conventional understanding within the field of radar signal processing is that the I or Q signal, while in principle enabling distance estimation based on beat frequency, is too inaccurate for high precision distance estimation. The I and Q signals are mathematically linked signal which are 90 degrees out of phase and together form a complex signal that fully represents both amplitude and phase. The conventional understanding has that for high-precision distance estimation using both I and Q is essential since they jointly provide the complete phase information needed for sub-wavelength accuracy.

Figure 12:
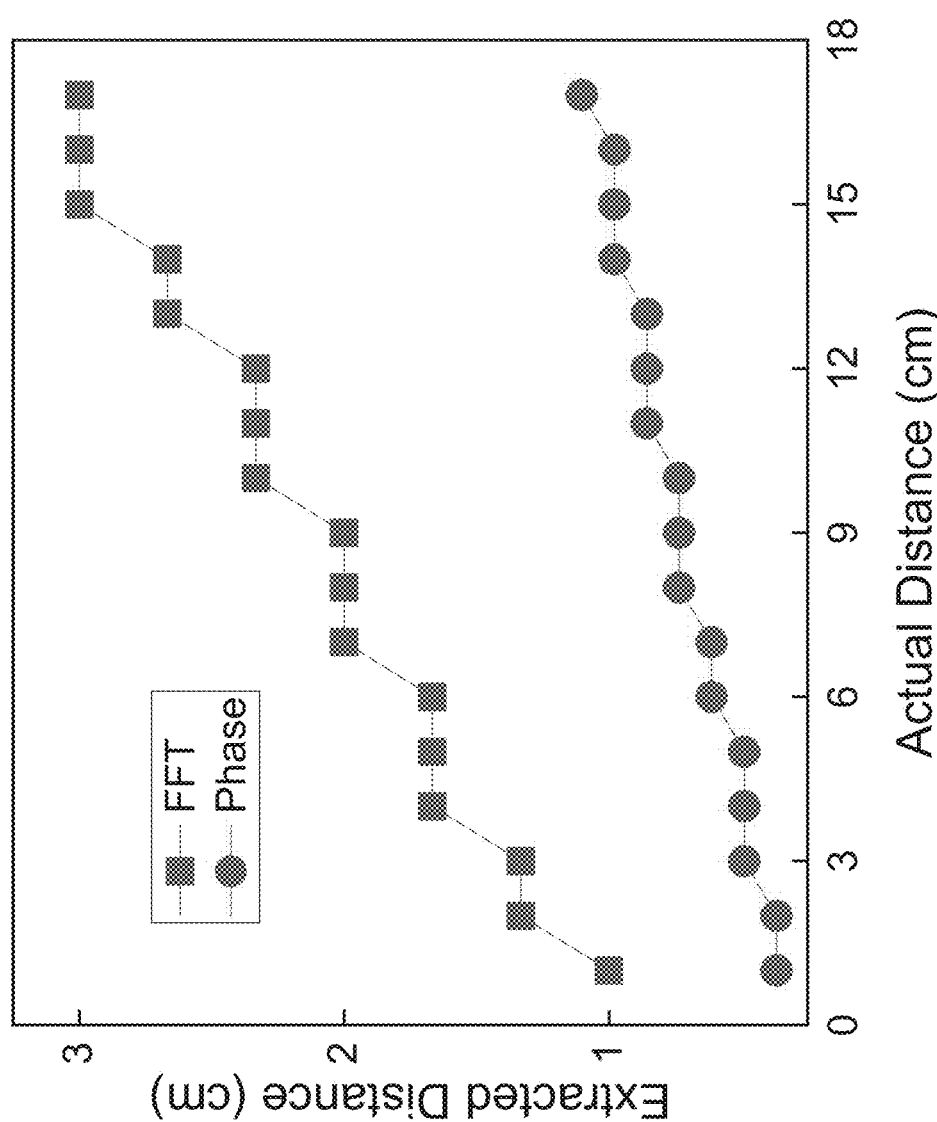
FIG. 12 shows a comparison of distance estimation results using FFT-based and phase-based methods for target distances for the working example.

In order to demonstrate the technical advantages of the disclosed method the I and Q signals measured in the working example were processed using conventional techniques to estimate the distance. As illustrated in FIG. 12, both FFT-based and phase-based methods were applied.

The FFT-based approach, shown with square markers, exhibits a quantization effect, where the estimated distance remains fixed across several actual distance steps. This behavior reflects the limited resolution of the FFT method, likely due to the inherent constraints of sampling frequency and chirp duration.

In contrast, the phase-based method, indicated by circular markers, provides a more refined and continuous estimate, demonstrating greater sensitivity to subtle distance variations. Even if a correction factor is introduced to calibrate the result at a reference point such as 1 cm, it would not yield accurate distance estimations across the full range up to 17 cm. This is because the underlying inaccuracies in both the FFT-based and phase-based methods are not simply offset errors but are nonlinear and depend on parameters such as sampling resolution, chirp characteristics, and signal phase behavior. Therefore, a single-point correction cannot account for the varying estimation errors that manifest differently at each distance.

The limited resolution of conventional FFT- and phase-based techniques in capturing fine-scale distance variations demonstrated in the foregoing highlights the need for a more precise signal analysis approach. More specifically, there is a need for a more robust method that account for the nonlinear behavior of the radar signals and improve sensitivity to subtle variations across the entire measurement range, thus overcoming the inherent resolution and scaling constraints of conventional FFT-based and phase-based techniques.

Compared to conventional FFT- and phase-based techniques, the proposed processing of a time-domain (e.g., the I or Q signal) alone is significantly faster and more efficient.

By focusing on a localized segment of the time-domain waveform and applying a regression model (e.g., direct curve fitting), the disclosed method avoids the need for full-spectrum transformations or phase unwrapping procedures. This not only reduces computational complexity but also minimizes memory usage, making the approach highly suitable for implementation on resource-constrained embedded systems or real-time radar processing platforms.

The invention claimed is:

1. A method for estimating a distance between a Frequency-Modulated Continuous-Wave (FMCW) radar sensor and a target, the FMCW radar sensor comprising a transmitter, a receiver and a signal processor, the method comprising:

emitting, by the transmitter, a radio wave, wherein the radio wave frequency is modulated over time;

obtaining, by the receiver, during said emitting of the radio wave, a time-domain in-phase signal and/or a time-domain quadrature-phase signal indicative of amplitude and phase information of an echo of the emitted radio wave;

selecting for processing, by the signal processor, the time-domain in-phase signal and/or the time-domain quadrature-phase signal;

isolating, by the signal processor, a segment of the selected time-domain in-phase signal and/or the time-domain quadrature-phase signal;

extracting, by the signal processor, a waveform metric from the isolated segment of the selected time-domain in-phase signal and/or the time-domain quadrature-phase signal;

obtaining, by the signal processor, a predetermined function defining a mapping between a plurality of waveform metrics and a corresponding plurality of distance values;

inputting, by the signal processer, the extracted waveform metric to the predetermined function; and receiving, by the signal processor, a distance outputted by the predetermined function.

2. The method according to claim 1, wherein the isolated segment comprises a portion of the selected time-domain in-phase signal and/or the time-domain quadrature-phase signal located between a first local minimum and a second subsequent local minimum.

3. The method according to claim 2, wherein the isolated segment comprises a signal peak.

4. The method according to claim 1, wherein the at least one waveform metric comprises at least a peak center location from the isolated segment.

5. The method according to claim 1, wherein the predetermined function comprises a regression model.

6. The method according to claim 1, wherein the predetermined function comprises a polynomial regression-based function.

7. The method according to claim 1, wherein the method comprises:

selecting for processing, by the signal processor, the time-domain in-phase signal or time-domain the quadrature-phase signal.

8. The method according to claim 1, wherein the obtained predetermined function has been determined by:

acquiring, by the signal processer, a plurality of extracted waveform metrics and a plurality of known distance value corresponding to the plurality of extracted waveform metrics;

determining, by the signal processer, a predetermined function by correlating the plurality of acquired waveform metrics with the corresponding plurality of known distances.

9. A method for calibrating a Frequency-Modulated Continuous-Wave (FMCW) radar sensor, the FMCW radar sensor comprising a transmitter, a receiver and a signal processor, the method comprises acquiring a plurality of waveform metrics corresponding to a plurality of known distances to a target, wherein the method comprises, for each distance among the plurality of known distances:

emitting, by the transmitter, a radio wave, wherein the radio wave frequency is modulated over time;

obtaining, by the receiver, during said emitting of the radio wave, a time-domain in-phase signal and/or a time-domain quadrature-phase signal indicative of amplitude and phase information of an echo of the emitted radio wave;

selecting for processing, by the signal processor, the time-domain in-phase signal and/or the time-domain quadrature-phase signal;

isolating, by the signal processor, a segment of the selected time-domain in-phase signal and/or the time-domain quadrature-phase signal;

extracting, by the signal processor, a waveform metric from the isolated segment of the selected time-domain in-phase signal and/or the time-domain quadrature-phase signal;

wherein the method further comprises:

determining, by the signal processer, a predetermined function by correlating the plurality of acquired waveform metrics with the corresponding plurality of known distances.

10. The method according to claim 9, wherein the isolated segment comprises a portion of the selected time-domain in-phase signal and/or the time-domain quadrature-phase signal located between a first local minimum and a second subsequent local minimum.

11. The method according to claim 10, wherein the isolated segment comprises a signal peak.

12. The method according to claim 9, wherein the at least one waveform metric comprises at least a peak center location from the isolated segment.

13. The method according to claim 9, wherein the predetermined function is a regression model.

14. The method according to claim 9, wherein the method comprises, for each distance among the plurality of known distances:

selecting for processing, by the signal processor, the time-domain in-phase signal or time-domain the quadrature-phase signal.

15. The method according to claim 9, wherein the isolated segment comprises a portion of the selected time-domain in-phase signal and/or the time-domain quadrature-phase signal located between a first local minimum and a second subsequent local minimum, and wherein the isolated segment comprises a signal peak.

16. A Frequency-Modulated Continuous-Wave FMCW radar sensor, the sensor comprising:

a transmitter configured to emit a radio wave, wherein the radio wave frequency is modulated over time;

a receiver configured to obtain, while the transmitter emits the radio wave, a time-domain in-phase signal and/or the time-domain quadrature-phase signal that is indicative of the amplitude and phase information of an echo of the emitted radio wave; and, a signal processor operatively connected to the receiver, the signal processor being configured to:

select for processing the time-domain in-phase signal and/or the time-domain quadrature-phase signal;

isolate a segment within the selected time-domain in-phase signal and/or the time-domain quadrature-phase signal;

extract a waveform metric from the isolated segment of the selected time-domain in-phase signal and/or the time-domain quadrature-phase signal; and obtaining, by the signal processor, a predetermined function defining a mapping between a plurality of waveform metrics and a corresponding plurality of distance values;

obtaining, by the signal processor, a predetermined function defining a mapping between a plurality of waveform metrics and a corresponding plurality of distance values;

inputting, by the signal processer, the extracted waveform metric to the predetermined function;

receiving, by the signal processor, a distance outputted by the predetermined function.

17. The FMCW radar sensor according to claim 16, wherein the at least one waveform metric comprises at least a peak center location from the isolated segment.

18. The FMCW radar sensor according to claim 16, wherein the predetermined function is a regression model.

19. The FMCW radar sensor according to claim 16, wherein the method comprises, for each distance among the plurality of known distances:

selecting for processing, by the signal processor, the time-domain in-phase signal or time-domain the quadrature-phase signal.

20. The FMCW radar sensor according to claim 16, wherein the obtained predetermined function has been determined by:

acquiring, by the signal processer, a plurality of extracted waveform metrics and a plurality of known distance value corresponding to the plurality of extracted waveform metrics;

determining, by the signal processer, a predetermined function by correlating the plurality of acquired waveform metrics with the corresponding plurality of known distances.

* * * * *